(12) United States Patent
Sharma et al.

(10) Patent No.: US 6,385,329 B1
(45) Date of Patent: May 7, 2002

(54) WAVELET DOMAIN WATERMARKS

(75) Inventors: Ravi K. Sharma, Hillsboro; Adnan M. Alattar, Tigard; Farid Ahmed, Beaverton; Geoffrey B. Rhoads, West Linn, all of OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/618,948

(22) Filed: Jul. 19, 2000

Related U.S. Application Data

(63) Continuation-in-part of application No. 09/503,881, filed on Feb. 14, 2000.

(51) Int. Cl.[7] ................................................. H04K 1/00
(52) U.S. Cl. ........................................................ 382/100
(58) Field of Search .................................. 382/100, 232; 380/210, 252, 287, 54; 713/176; 370/527, 529; 704/200.1; 381/73.1

(56) References Cited

U.S. PATENT DOCUMENTS

| | | | |
|---|---|---|---|
| 5,636,292 A | 6/1997 | Rhoads | 382/232 |
| 5,835,639 A | 11/1998 | Honsinger et al. | 382/278 |
| 5,862,260 A | 1/1999 | Rhoads | 382/232 |
| 6,122,403 A | 9/2000 | Rhoads | 382/233 |
| 6,226,387 B1 * | 5/2001 | Tewfik et al. | 382/100 |

FOREIGN PATENT DOCUMENTS

EP    0 891 071 A2 *   1/1999    ............ H04N/1/32

OTHER PUBLICATIONS

Chae et al., "A Robust Embedded Data from Wavelet Coefficients," *Proc. SPIE vol. 3312: Storage and Retrieval for Image and Video Databases VI*, Dec. 1997, pp. 308–317.*

Wei et al., "Perceptual Digital Watermark of Images Using Wavelet Transform," *IEEE Trans. on Consumer Electronics*, vol. 44, No. 4, Nov. 1998, pp. 1267–1272.*

Kim et al., "Wavelet Based Watermarking Method for Digital Images Using the Human Visual System," *IEEE Proc. Int. Symp. on Circuits and Systems*, May/Jun. 1999, vol. IV, pp. 80–83.*

(List continued on next page.)

*Primary Examiner*—Andrew W. Johns
(74) *Attorney, Agent, or Firm*—Joel R. Meyer; Digimarc Corporation

(57) ABSTRACT

A wavelet domain watermark encoder and decoder embed and detect auxiliary signals in a media signal, such as a still image, video or audio signal. A watermark orientation signal is embedded in a wavelet decomposed signal to facilitate detection of the watermark in a geometrically distorted version of the embedded signal.

27 Claims, 22 Drawing Sheets

OTHER PUBLICATIONS

Inoue et al., "A Digital Watermark Method Using the Wavelet Transform for Video Data," *IEEE Proc. Int. Symp. on Circuits and Systems*, May/Jun. 1999, vol. IV, pp. 247–250.*

Kim et al., "A Robust Wavelet–Based Digital Watermarking Using Level–Adaptive Thresholding," *IEEE Proc. Int. Conf. on Image Processing*, Oct. 1999, vol. II, pp. 226–230.*

Inoue et al., "A Digital Watermark Method Using the Wavelet Transform for Video Data," *IEICE Trans. Fundamentals*, vol. E83–A, No. 1, Jan. 2000, pp. 90–96.*

Houn–Jyh et al., "Wavelet Based Digital Image Watermarking," *Optics Express*, vol. 3, No. 12, pp. 491–496, Dec. 7, 1998.

Hsu et al., "Multiresolution Watermarking for Digital Images," *IEEE Trans. on Circuits and Systems II: Analog and Digital Signal Processing*, vol. 45, No. 8, pp. 1097–1101, Aug., 1998.

Kundur et al., "A Robust Digital Image Watermarking Method Using Wavelet–Based Fusion," *Int. Conf. on Image Proc.*, Oct. 1997, pp. 544–547.

Kundur et al., "Digital Watermarking Using Multiresolution Wavelet Decomposition," *Proc. of 1998 IEEE Int. Conf. on Acoustics, Speech and Signal Processing*, ICASSP '98, pp. 2969–2972, vol. 5.

Matsui et al., "Embedding a Signature to Pictures Under Wavelet Transformation," *Transactions of the Institute of Electronics Information and Communication Engineers D–II*, vol. J79D–II, No. 6, Jun., 1996, pp. 1017–1024.

Matsui et al., "Use of the Wavelet Transformation to Embed Signatures in Images," *Systems and Computers in Japan*, Jan., 1997, vol. 28, No. 1, pp. 87–94.

Meerwald et al., "A Survey of Wavelet–domain Watermarking Algorithms", *Security and Watermarking of Multimedia Contents III*, Jan. 2001, vol. 4314, pp. 505–516.

Onishi et al., "A Method of Watermarking with Multiresolution Analysis and Pseudo Noise Sequences," *Systems and Computers in Japan*, vol. 29, No. 5, pp. 11–19, May 1998.

Ohnishi et al., Embedding a Seal into a Picture Under Orthogonal Wavelet Transform, *Proceedings of Multimedia '96*, 1996, IEEE, pp. 514–521.

Swanson et al., "Multiresolution Scene–Based Video Watermarking Using Perceptual Models," *IEEE Journal on Selected Areas in Communications*, May, 1998, vol. 16, No. 4, pp. 540–550.

Swanson et al., "Multiresolution Video Watermarking Using Preceptual Models and Scene Segmentation," *Proc. Int. Conf. on Image Processing*, vol. 2, pp. 558–561, Oct., 1997.

Wei et al., "Perceptual Digital Watermark of Images Using Wavelet Transform," *IEEE Transactions on Consumer Electronics*, vol. 44, No. 4, pp. 1267–1272, Nov. 1998.

Tsekeridou et al., "Embedding self–similar watermarks in the wavelet domain," *Proceeding of the IEEE ICASSP 2000*, Jun. 2000.

Pereira et al., "Optimized Wavelet Domain Watermark Embedding Strategy Using Linear Programming", *SPIE AeroSense 2000: Wavelet Applications*, Apr. 2000.

Tsekeridou et al., "Wavelet–Based Self–Similar Watermarking for Still Images", *2000 IEEE International Symposium on Circuits and Systems*, Emerging Technologies for the $21^{st}$ Centruy, May 2000, pp. 220–223.

* cited by examiner

One Quadrant Spatial Transform Domain

Magnitude of Watermark Orientation Signal in frequency domain

Real value of Watermark Orientation Signal in spatial domain

WAVELET DOMAIN WATERMARKS

RELATED APPLICATION DATA

This application is a continuation in part of U.S. patent application Ser. No. 09/503,881, filed Feb. 14, 2000.

TECHNICAL FIELD

The invention relates to digital watermarks, and specifically relates to encoding and decoding auxiliary information in media signals, such as images, audio and video.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the present assignee's co-pending application Ser. No. 09/503,881.

The invention relates to encoding and decoding auxiliary signals in a media signal, such as a still image, video or audio signal, using a wavelet or subband decomposition of the signal. One aspect of the invention is a method of embedding an auxiliary signal into a media signal so that the auxiliary signal is substantially imperceptible. This method performs a wavelet decomposition of the media signal, and embeds a watermark orientation signal into the wavelet decomposition. The auxiliary signal includes a signal used to determine orientation of the auxiliary signal called the watermark orientation signal. This orientation signal has attributes used to determine orientation of the auxiliary signal in a geometrically distorted version of the media signal. The orientation signal may carry a message comprising one or more symbols (e.g., binary or M-ary symbols) of information. Alternatively, a separate watermark message signal may carry the message. When embedded as separate signals, the orientation and message signal components of the watermark may be orthogonal to one another. In a wavelet decomposition of the host signal, the watermark embedder may insert the message and orientation signal components in separate subbands.

Another aspect of the invention is a method of detecting an auxiliary signal embedded in a media signal, where the auxiliary information is substantially imperceptible in an output form of the media signal. This method performs a wavelet decomposition of the media signal into two or more levels of resolution. It correlates a reference watermark orientation signal with the wavelet decomposition of the media signal to determine orientation of the auxiliary signal in the media signal.

Another aspect of the invention is an alternative method of encoding an auxiliary signal in a media signal. This method performs a wavelet decomposition of the media signal into two or more levels of resolution, including an approximate level and one or more higher resolution levels. It then modifies the approximate level to encode an auxiliary signal such that the modification is substantially imperceptible in an output form of the media signal.

Another aspect of the invention is a method of detecting an auxiliary signal embedded in a media signal, where the auxiliary information is substantially imperceptible in an output form of the media signal. This method performs a wavelet decomposition of the media signal into two or more levels of resolution, including an approximate level and one or more higher resolution levels, and detects the auxiliary information from the approximate level.

Additional features of the invention will become apparent with reference to the following detailed description and accompanying drawings.

DETAILED DESCRIPTION

1.0 Introduction

Figure 1:
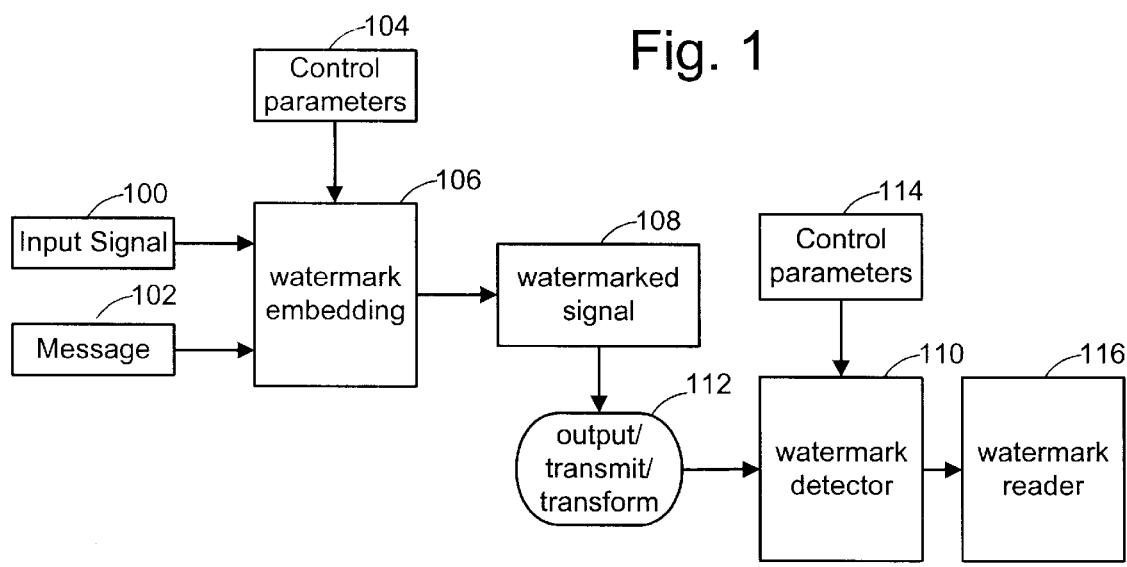
FIG. 1 is a block diagram illustrating an image watermark system.

A watermark can be viewed as an information signal that is embedded in a host signal, such as an image, audio, or some other media content. Watermarking systems based on the following detailed description may include the following components: 1) An embedder that inserts a watermark signal in the host signal to form a combined signal; 2) A detector that determines the presence and orientation of a watermark in a potentially corrupted version of the combined signal; and 3) A reader that extracts a watermark message from the combined signal. In some implementations, the detector and reader are combined.

The structure and complexity of the watermark signal can vary significantly, depending on the application. For example, the watermark may be comprised of one or more signal components, each defined in the same or different domains. Each component may perform one or more functions. Two primary functions include acting as an identifier to facilitate detection and acting as an information carrier to convey a message. In addition, components may be located in different spatial or temporal portions of the host signal, and may carry the same or different messages.

The host signal can vary as well. The host is typically some form of multi-dimensional media signal, such as an image, audio sequence or video sequence. In the digital domain, each of these media types is represented as a multi-dimensional array of discrete samples. For example, a color image has spatial dimensions (e.g., its horizontal and vertical components), and color space dimensions (e.g., YUV or RGB). Some signals, like video, have spatial and temporal dimensions. Depending on the needs of a particular application, the embedder may insert a watermark signal that exists in one or more of these dimensions.

In the design of the watermark and its components, developers are faced with several design issues such as: the extent to which the mark is impervious to jamming and manipulation (either intentional or unintentional); the extent of imperceptibility; the quantity of information content; the extent to which the mark facilitates detection and recovery, and the extent to which the information content can be recovered accurately.

For certain applications, such as copy protection or authentication, the watermark should be difficult to tamper with or remove by those seeking to circumvent it. To be robust, the watermark must withstand routine manipulation, such as data compression, copying, linear transformation, flipping, inversion, etc., and intentional manipulation intended to remove the mark or make it undetectable. Some applications require the watermark signal to remain robust through digital to analog conversion (e.g., printing an image or playing music), and analog to digital conversion (e.g., scanning the image or digitally sampling the music). In some cases, it is beneficial for the watermarking technique to withstand repeated watermarking.

A variety of signal processing techniques may be applied to address some or all of these design considerations. One such technique is referred to as spreading. Sometimes categorized as a spread spectrum technique, spreading is a way to distribute a message into a number of components (chips), which together make up the entire message. Spreading makes the mark more impervious to jamming and manipulation, and makes it less perceptible.

Another category of signal processing technique is error correction and detection coding. Error correction coding is useful to reconstruct the message accurately from the watermark signal. Error detection coding enables the decoder to determine when the extracted message has an error.

Another signal processing technique that is useful in watermark coding is called scattering. Scattering is a method of distributing the message or its components among an array of locations in a particular transform domain, such as a spatial domain or a spatial frequency domain. Like spreading, scattering makes the watermark less perceptible and more impervious to manipulation.

Yet another signal processing technique is gain control. Gain control is used to adjust the intensity of the watermark signal. The intensity of the signal impacts a number of aspects of watermark coding, including its perceptibility to the ordinary observer, and the ability to detect the mark and accurately recover the message from it.

Gain control can impact the various functions and components of the watermark differently. Thus, in some cases, it is useful to control the gain while taking into account its impact on the message and orientation functions of the watermark or its components. For example, in a watermark system described below, the embedder calculates a different gain for orientation and message components of an image watermark.

Another useful tool in watermark embedding and reading is perceptual analysis. Perceptual analysis refers generally to techniques for evaluating signal properties based on the extent to which those properties are (or are likely to be) perceptible to humans (e.g., listeners or viewers of the media content). A watermark embedder can take advantage of a Human Visual System (HVS) model to determine where to place a watermark and how to control the intensity of the watermark so that chances of accurately recovering the watermark are enhanced, resistance to tampering is increased, and perceptibility of the watermark is reduced. Such perceptual analysis can play an integral role in gain control because it helps indicate how the gain can be adjusted relative to the impact on the perceptibility of the mark. Perceptual analysis can also play an integral role in locating the watermark in a host signal. For example, one might design the embedder to hide a watermark in portions of a host signal that are more likely to mask the mark from human perception.

Various forms of statistical analyses may be performed on a signal to identify places to locate the watermark, and to identify places where to extract the watermark. For example, a statistical analysis can identify portions of a host image that have noise-like properties that are likely to make recovery of the watermark signal difficult. Similarly, statistical analyses may be used to characterize the host signal to determine where to locate the watermark.

Each of the techniques may be used alone, in various combinations, and in combination with other signal processing techniques.

In addition to selecting the appropriate signal processing techniques, the developer is faced with other design considerations. One consideration is the nature and format of the media content. In the case of digital images, for example, the image data is typically represented as an array of image samples. Color images are represented as an array of color vectors in a color space, such as RGB or YUV. The watermark may be embedded in one or more of the color components of an image. In some implementations, the embedder may transform the input image into a target color space, and then proceed with the embedding process in that color space.

2.0 Digital Watermark Embedder and Reader Overview

The following sections describe implementations of a watermark embedder and reader that operate on digital signals. The embedder encodes a message into a digital signal by modifying its sample values such that the message is imperceptible to the ordinary observer in output form. To extract the message, the reader captures a representation of the signal suspected of containing a watermark and then processes it to detect the watermark and decode the message.

FIG. 1 is a block diagram summarizing signal processing operations involved in embedding and reading a watermark. There are three primary inputs to the embedding process: the original, digitized signal 100, the message 102, and a series of control parameters 104. The control parameters may include one or more keys. One key or set of keys may be used to encrypt the message. Another key or set of keys may be used to control the generation of a watermark carrier signal or a mapping of information bits in the message to positions in a watermark information signal.

The carrier signal or mapping of the message to the host signal may be encrypted as well. Such encryption may increase security by varying the carrier or mapping for different components of the watermark or watermark message. Similarly, if the watermark or watermark message is redundantly encoded throughout the host signal, one or more encryption keys can be used to scramble the carrier or signal mapping for each instance of the redundantly encoded watermark. This use of encryption provides one way to vary the encoding of each instance of the redundantly encoded message in the host signal. Other parameters may include control bits added to the message, and watermark signal attributes (e.g., orientation or other detection patterns) used to assist in the detection of the watermark.

Apart from encrypting or scrambling the carrier and mapping information, the embedder may apply different, and possibly unique carrier or mapping for different components of a message, for different messages, or for different watermarks or watermark components to be embedded in the host signal. For example, one watermark may be encoded in a block of samples with one carrier, while another, possibly different watermark, is encoded in a different block with a different carrier. A similar approach is to use different mappings in different blocks of the host signal.

The watermark embedding process 106 converts the message to a watermark information signal. It then combines this signal with the input signal and possibly another signal (e.g., an orientation pattern) to create a watermarked signal 108. The process of combining the watermark with the input signal may be a linear or non-linear function. Examples of watermarking functions include: $S^*=S+gX$; $S^*=S(1+gX)$; and $S^*=S\,e^{gX}$; where $S^*$ is the watermarked signal vector, $S$ is the input signal vector, and $g$ is a function controlling watermark intensity. The watermark may be applied by modulating signal samples $S$ in the spatial, temporal or some other transform domain.

To encode a message, the watermark encoder analyzes and selectively adjusts the host signal to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

Some processes for combining the watermark with the input signal are termed non-linear, such as processes that employ dither modulation, modify least significant bits, or apply quantization index modulation. One type of non-linear modulation is where the embedder sets signal values so that they have some desired value or characteristic corresponding to a message symbol. For example, the embedder may designate that a portion of the host signal is to encode a given bit value. It then evaluates a signal value or set of values in that portion to determine whether they have the attribute corresponding to the message bit to be encoded. Some examples of attributes include a positive or negative polarity, a value that is odd or even, a checksum, etc. For example, a bit value may be encoded as a one or zero by quantizing the value of a selected sample to be even or odd. As another example, the embedder might compute a checksum or parity of an N bit pixel value or transform coefficient and then set the least significant bit to the value of the checksum or parity. Of course, if the signal already corresponds to the desired message bit value, it need not be altered. The same approach can be extended to a set of signal samples where some attribute of the set is adjusted as necessary to encode a desired message symbol. These techniques can be applied to signal samples in a transform domain (e.g., transform coefficients) or samples in the temporal or spatial domains.

Quantization index modulation techniques employ a set of quantizers. In these techniques, the message to be transmitted is used as an index for quantizer selection. In the decoding process, a distance metric is evaluated for all quantizers and the index with the smallest distance identifies the message value.

The watermark detector 110 operates on a digitized signal suspected of containing a watermark. As depicted generally in FIG. 1, the suspect signal may undergo various transformations 112, such as conversion to and from an analog domain, cropping, copying, editing, compression/decompression, transmission etc. Using parameters 114 from the embedder (e.g., orientation pattern, control bits, key(s)), it performs a series of correlation or other operations on the captured image to detect the presence of a watermark. If it finds a watermark, it determines its orientation within the suspect signal.

Using the orientation, if necessary, the reader 116 extracts the message. Some implementations do not perform correlation, but instead, use some other detection process or proceed directly to extract the watermark signal. For instance in some applications, a reader may be invoked one or more times at various temporal or spatial locations in an attempt to read the watermark, without a separate pre-processing stage to detect the watermark's orientation.

Some implementations require the original, un-watermarked signal to decode a watermark message, while others do not. In those approaches where the original signal is not necessary, the original un-watermarked signal can still be used to improve the accuracy of message recovery. For example, the original signal can be removed, leaving a residual signal from which the watermark message is recovered. If the decoder does not have the original signal, it can still attempt to remove portions of it (e.g., by filtering) that are expected not to contain the watermark signal.

Watermark decoder implementations use known relationships between a watermark signal and a message symbol to extract estimates of message symbol values from a signal suspected of containing a watermark. The decoder has knowledge of the properties of message symbols and how and where they are encoded into the host signal to encode a message. For example, it knows how message bit values of one and a zero are encoded and it knows where these message bits are originally encoded. Based on this information, it can look for the message properties in the watermarked signal. For example, it can test the watermarked signal to see if it has attributes of each message symbol (e.g., a one or zero) at a particular location and generate a probability measure as an indicator of the likelihood that a message symbol has been encoded. Knowing the approximate location of the watermark in the watermarked signal, the reader implementation may compare known message properties with the properties of the watermarked signal to estimate message values, even if the original signal is unavailable. Distortions to the watermarked signal and the host signal itself make the watermark difficult to recover, but accurate recovery of the message can be enhanced using a variety of techniques, such as error correction coding, watermark signal prediction, redundant message encoding, etc.

One way to recover a message value from a watermarked signal is to perform correlation between the known message property of each message symbol and the watermarked signal. If the amount of correlation exceeds a threshold, for example, then the watermarked signal may be assumed to contain the message symbol. The same process can be repeated for different symbols at various locations to extract a message. A symbol (e.g., a binary value of one or zero) or set of symbols may be encoded redundantly to enhance message recovery.

In some cases, it is useful to filter the watermarked signal to remove aspects of the signal that are unlikely to be helpful in recovering the message and/or are likely to interfere with the watermark message. For example, the decoder can filter out portions of the original signal and another watermark signal or signals. In addition, when the original signal is unavailable, the reader can estimate or predict the original signal based on properties of the watermarked signal. The original or predicted version of the original signal can then be used to recover an estimate of the watermark message. One way to use the predicted version to recover the watermark is to remove the predicted version before reading the desired watermark. Similarly, the decoder can predict and remove unwanted watermarks or watermark components before reading the desired watermark in a signal having two or more watermarks.

2.1 Image Watermark Embedder

Figure 2:
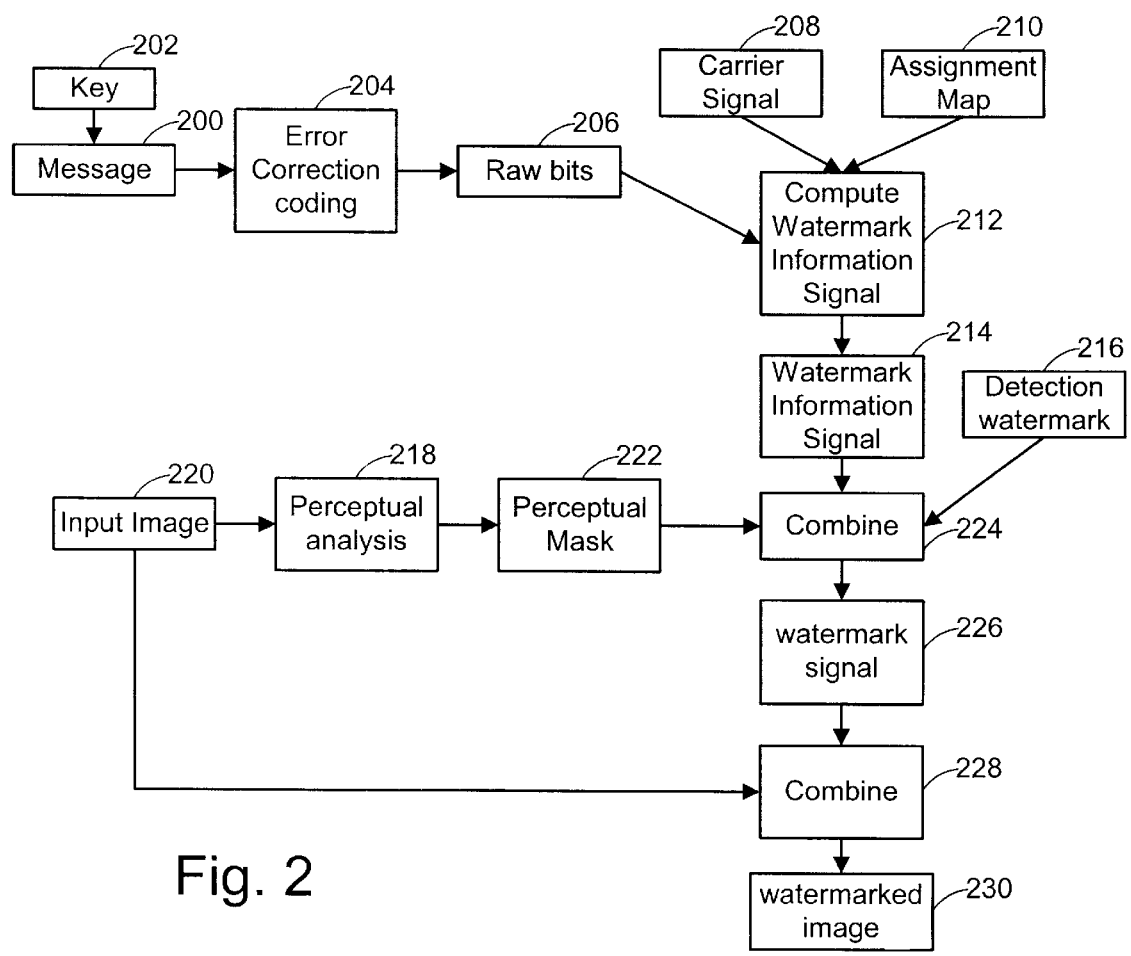
FIG. 2 is a block diagram illustrating an image watermark embedder.

FIG. 2 is a block diagram illustrating an implementation of an exemplary embedder in more detail. The embedding process begins with the message 200. As noted above, the message is binary number suitable for conversion to a watermark signal. For additional security, the message, its carrier, and the mapping of the watermark to the host signal may be encrypted with an encryption key 202. In addition to the information conveyed in the message, the embedder may also add control bit values ("signature bits") to the message to assist in verifying the accuracy of a read operation. These control bits, along with the bits representing the message, are input to an error correction coding process 204 designed to increase the likelihood that the message can be recovered accurately in the reader.

There are several alternative error correction coding schemes that may be employed. Some examples include BCH, convolution, Reed Solomon and turbo codes. These forms of error correction coding are sometimes used in communication applications where data is encoded in a carrier signal that transfers the encoded data from one place to another. In the digital watermarking application discussed here, the raw bit data is encoded in a fundamental carrier signal.

In addition to the error correction coding schemes mentioned above, the embedder and reader may also use a Cyclic Redundancy Check (CRC) to facilitate detection of errors in the decoded message data.

The error correction coding function 204 produces a string of bits, termed raw bits 206, that are embedded into a watermark information signal. Using a carrier signal 208 and an assignment map 210, the illustrated embedder encodes the raw bits in a watermark information signal 212, 214. In some applications, the embedder may encode a different message in different locations of the signal. The carrier signal may be a noise image. For each raw bit, the assignment map specifies the corresponding image sample or samples that will be modified to encode that bit.

The embedder depicted in FIG. 2 operates on blocks of image data (referred to as 'tiles') and replicates a watermark in each of these blocks. As such, the carrier signal and assignment map both correspond to an image block of a pre-determined size, namely, the size of the tile. To encode each bit, the embedder applies the assignment map to determine the corresponding image samples in the block to be modified to encode that bit. Using the map, it finds the corresponding image samples in the carrier signal. For each bit, the embedder computes the value of image samples in the watermark information signal as a function of the raw bit value and the value(s) of the corresponding samples in the carrier signal.

To illustrate the embedding process further, it is helpful to consider an example. First, consider the following background. Digital watermarking processes are sometimes described in terms of the transform domain in which the watermark signal is defined. The watermark may be defined in the spatial or temporal domain, or some other transform domain such as a wavelet transform, Discrete Cosine Transform (DCT), Discrete Fourier Transform (DFT), Hadamard transform, Hartley transform, Karhunen-Loeve transform (KLT) domain, etc.

Consider an example where the watermark is defined in a transform domain (e.g., a frequency domain such as DCT, wavelet or DFT). The embedder segments the image in the spatial domain into rectangular tiles and transforms the image samples in each tile into the transform domain. For example in the DCT domain, the embedder segments the image into N by N blocks and transforms each block into an N by N block of DCT coefficients. In this example, the assignment map specifies the corresponding sample location or locations in the frequency domain of the tile that correspond to a bit position in the raw bits. In the frequency domain, the carrier signal looks like a noise pattern. Each image sample in the frequency domain of the carrier signal is used together with a selected raw bit value to compute the value of the image sample at the location in the watermark information signal.

Now consider an example where the watermark is defined in the spatial domain. The embedder segments the image in the spatial domain into rectangular tiles of image samples (i.e. pixels). In this example, the assignment map specifies the corresponding sample location or locations in the tile that correspond to each bit position in the raw bits. In the spatial domain, the carrier signal looks like a noise pattern extending throughout the tile. Each image sample in the spatial domain of the carrier signal is used together with a selected raw bit value to compute the value of the image sample at the same location in the watermark information signal.

With this background, the embedder proceeds to encode each raw bit in the selected transform domain as follows. It uses the assignment map to look up the position of the corresponding image sample (or samples) in the carrier signal. The image sample value at that position in the carrier controls the value of the corresponding position in the watermark information signal. In particular, the carrier sample value indicates whether to invert the corresponding watermark sample value. The raw bit value is either a one or zero. Disregarding for a moment the impact of the carrier signal, the embedder adjusts the corresponding watermark sample upward to represent a one, or downward to represent a zero. Now, if the carrier signal indicates that the corresponding sample should be inverted, the embedder adjusts the watermark sample downward to represent a one, and upward to represent a zero. In this manner, the embedder computes the value of the watermark samples for a raw bit using the assignment map to find the spatial location of those samples within the block.

From this example, a number of points can be made. First, the embedder may perform a similar approach in any other transform domain. Second, for each raw bit, the corresponding watermark sample or samples are some function of the raw bit value and the carrier signal value. The specific mathematical relationship between the watermark sample, on one hand, and the raw bit value and carrier signal, on the other, may vary with the implementation. For example, the message may be convolved with the carrier, multiplied with the carrier, added to the carrier, or applied based on another non-linear function. Third, the carrier signal may remain constant for a particular application, or it may vary from one message to another. For example, a secret key may be used to generate the carrier signal. For each raw bit, the assignment map may define a pattern of watermark samples in the transform domain in which the watermark is defined. An assignment map that maps a raw bit to a sample location or set of locations (i.e. a map to locations in a frequency or spatial domain) is just one special case of an assignment map for a transform domain. Fourth, the assignment map may remain constant, or it may vary from one message to another. In addition, the carrier signal and map may vary depending on the nature of the underlying image. In sum, there many possible design choices within the implementation framework described above.

The embedder depicted in FIG. 2 combines another watermark component, shown as the detection watermark 216, with the watermark information signal to compute the final watermark signal. The detection watermark is specifically chosen to assist in identifying the watermark and computing its orientation in a detection operation.

Figure 3:
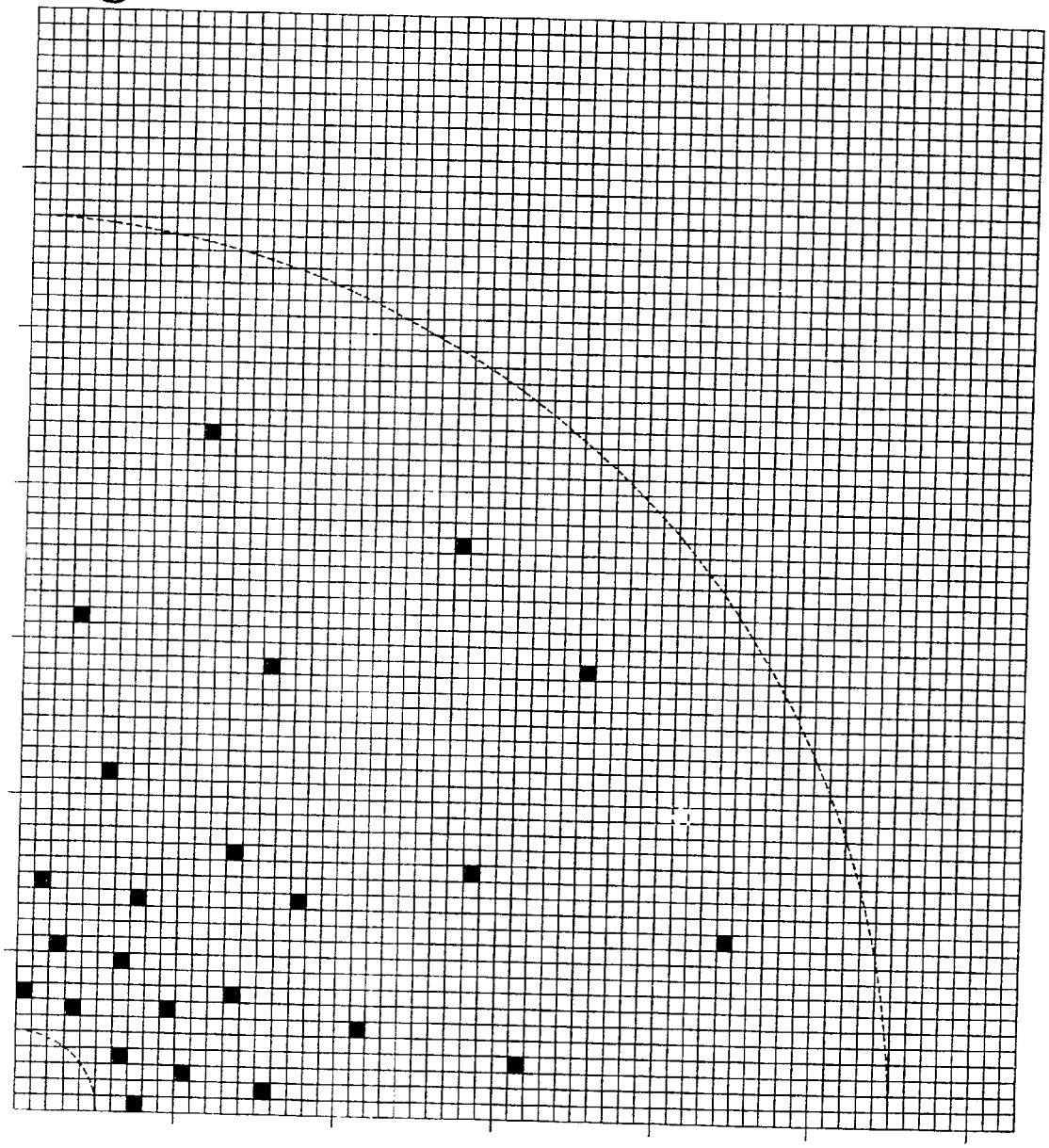
FIG. 3 is a spatial frequency domain plot of a detection watermark signal.

FIG. 3 is a spatial frequency plot illustrating one quadrant of a detection watermark. The points in the plot represent impulse functions indicating signal content of the detection watermark signal. The pattern of impulse functions for the illustrated quadrant is replicated in all four quadrants. There are a number of properties of the detection pattern that impact its effectiveness for a particular application. The selection of these properties is highly dependent on the application. One property is the extent to which the pattern is symmetric about one or more axes. For example, if the detection pattern is symmetrical about the horizontal and vertical axes, it is referred to as being quad symmetric. If it is further symmetrical about diagonal axes at an angle of 45 degrees, it is referred to as being octally symmetric (repeated in a symmetric pattern 8 times about the origin). Such symmetry aids in identifying the watermark in an image, and aids in extracting the rotation angle. However, in the case of an octally symmetric pattern, the detector includes an additional step of testing which of the four quadrants the orientation angle falls into.

Another criterion is the position of the impulse functions and the frequency range that they reside in. Preferably, the impulse functions fall in a mid frequency range. If they are located in a low frequency range, they may be noticeable in the watermarked image. If they are located in the high frequency range, they are more difficult to recover. Also, they should be selected so that scaling, rotation, and other manipulations of the watermarked signal do not push the impulse functions outside the range of the detector. Finally, the impulse functions should preferably not fall on the vertical or horizontal axes, and each impulse function should have a unique horizontal and vertical location. While the example depicted in FIG. 3 shows that some of the impulse functions fall on the same horizontal axis, it is trivial to alter the position of the impulse functions such that each has a unique vertical or horizontal coordinate.

Returning to FIG. 2, the embedder makes a perceptual analysis 218 of the input image 220 to identify portions of the image that can withstand more watermark signal content without substantially impacting image fidelity. Generally, the perceptual analysis employs a HVS model to identify signal frequency bands and/or spatial areas to increase or decrease watermark signal intensity to make the watermark imperceptible to an ordinary observer. One type of model is to increase watermark intensity in frequency bands and spatial areas where there is more image activity. In these areas, the sample values are changing more than other areas and have more signal strength. The output of the perceptual analysis is a perceptual mask 222. The mask may be implemented as an array of functions, which selectively increase the signal strength of the watermark signal based on a HVS model analysis of the input image. The mask may selectively increase or decrease the signal strength of the watermark signal in areas of greater signal activity.

The embedder combines (224) the watermark information, the detection signal and the perceptual mask to yield the watermark signal 226. Finally, it combines (228) the input image 220 and the watermark signal 226 to create the watermarked image 230. In the frequency domain watermark example above, the embedder combines the transform domain coefficients in the watermark signal to the corresponding coefficients in the input image to create a frequency domain representation of the watermarked image. It then transforms the image into the spatial domain. As an alternative, the embedder may be designed to convert the watermark into the spatial domain, and then add it to the image.

In the spatial watermark example above, the embedder combines the image samples in the watermark signal to the corresponding samples in the input image to create the watermarked image 230.

The embedder may employ an invertible or non-invertible, and linear or non-linear function to combine the watermark signal and the input image (e.g., linear functions such as S*=S+gX; or S*=S(1+gX), convolution, quantization index modulation). The net effect is that some image samples in the input image are adjusted upward, while others are adjusted downward. The extent of the adjustment is greater in areas or subbands of the image having greater signal activity.

2.2. Overview of a Detector and Reader

Figure 4:
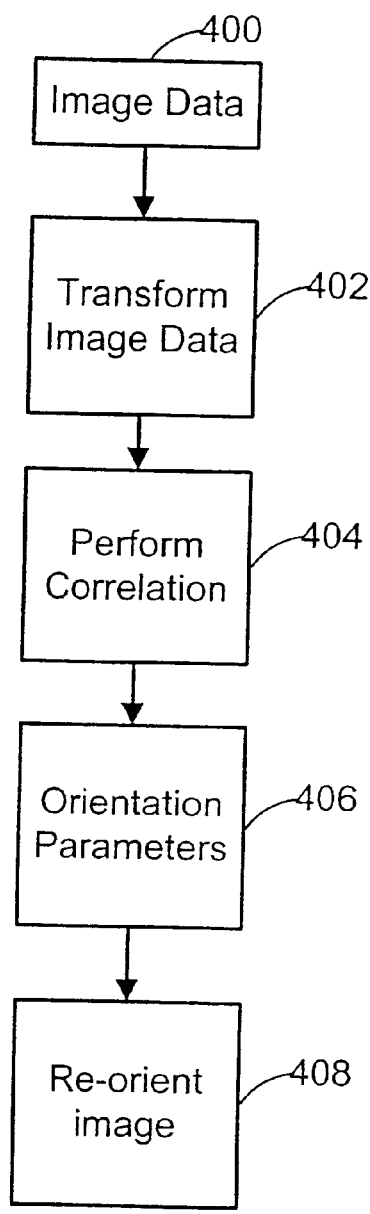
FIG. 4 is a flow diagram of a process for detecting a watermark signal in an image and computing its orientation within the image.

FIG. 4 is a flow diagram illustrating an overview of a watermark detection process. This process analyzes image data 400 to search for an orientation pattern of a watermark in an image suspected of containing the watermark (the target image). First, the detector transforms the image data to another domain 402, namely the spatial frequency domain, and then performs a series of correlation or other detection operations 404. The correlation operations match the orientation pattern with the target image data to detect the presence of the watermark and its orientation parameters 406 (e.g., translation, scale, rotation, and differential scale relative to its original orientation). Finally, it re-orients the image data based on one or more of the orientation parameters 408.

Figure 5:
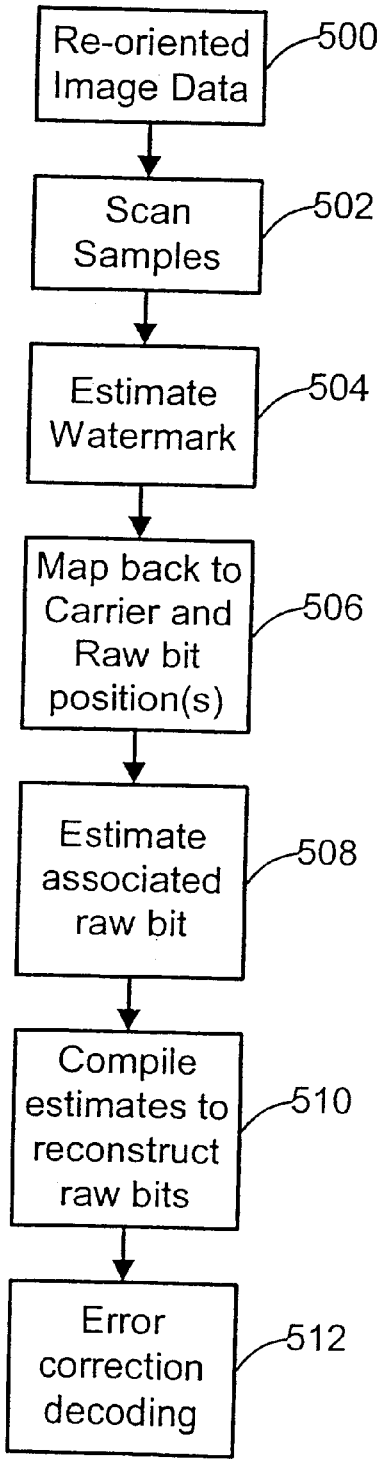
FIG. 5 is a flow diagram of a process reading a message encoded in a watermark.

If the orientation of the watermark is recovered, the reader extracts the watermark information signal from the image data (optionally by first re-orienting the data based on the orientation parameters). FIG. 5 is flow diagram illustrating a process of extracting a message from re-oriented image data 500. The reader scans the image samples (e.g., pixels or transform domain coefficients) of the re-oriented image (502), and uses known attributes of the watermark signal to estimate watermark signal values 504. Recall that in one example implementation described above, the embedder adjusted sample values (e.g., frequency coefficients, color values, etc.) up or down to embed a watermark information signal. The reader uses this attribute of the watermark information signal to estimate its value from the target image. Prior to making these estimates, the reader may filter the image to remove portions of the image signal that may interfere with the estimating process. For example, if the watermark signal is expected to reside in low or medium frequency bands, then high frequencies may be filtered out.

In addition, the reader may predict the value of the original un-watermarked image to enhance message recovery. One form of prediction uses temporal or spatial neighbors to estimate a sample value in the original image. In the frequency domain, frequency coefficients of the original signal can be predicted from neighboring frequency coefficients in the same frequency subband. In video applications for example, a frequency coefficient in a frame can be predicted from spatially neighboring coefficients within the same frame, or temporally neighboring coefficients in adjacent frames or fields. In the spatial domain, intensity values of a pixel can be estimated from intensity values of neighboring pixels. Having predicted the value of a signal in the original, un-watermarked image, the reader then estimates the watermark signal by calculating an inverse of the watermarking function used to combine the watermark signal with the original signal.

For such watermark signal estimates, the reader uses the assignment map to find the corresponding raw bit position and image sample in the carrier signal (506). The value of the raw bit is a function of the watermark signal estimate, and the carrier signal at the corresponding location in the carrier. To estimate the raw bit value, the reader solves for its value based on the carrier signal and the watermark signal estimate. As reflected generally in FIG. 5 (508), the result of this computation represents only one estimate to be analyzed along with other estimates impacting the value of the corresponding raw bit. Some estimates may indicate that the raw bit is likely to be a one, while others may indicate that it is a zero. After the reader completes its scan, it compiles the estimates for each bit position in the raw bit string, and makes a determination of the value of each bit at that position (510). Finally, it performs the inverse of the error correction coding scheme to construct the message (512). In some implementations, probablistic models may be employed to determine the likelihood that a particular pattern of raw bits is just a random occurrence rather than a watermark.

2.2.1 Example Illustrating Detector Process

Figure 6:
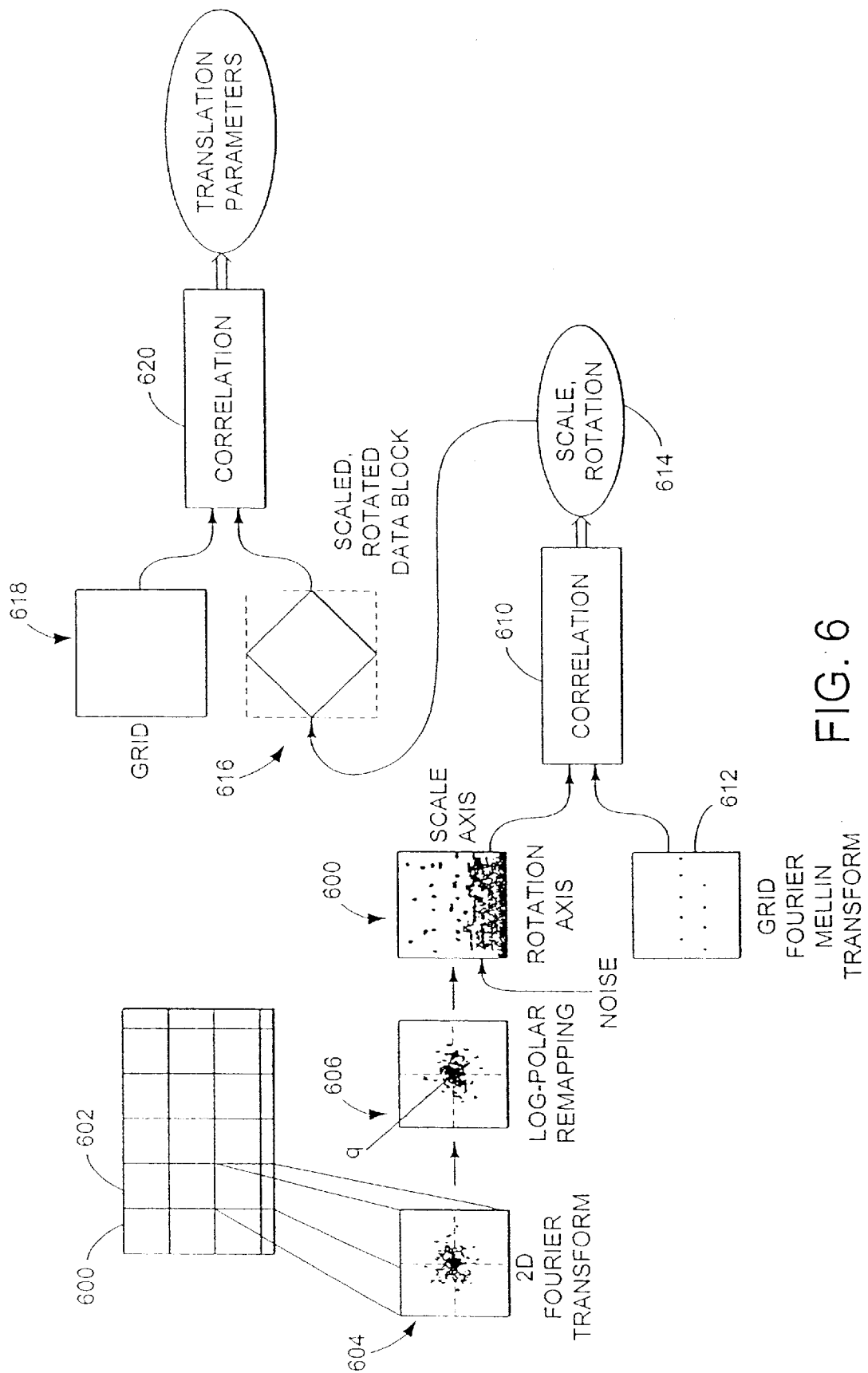
FIG. 6 is a diagram depicting an example of a watermark detection process.

FIG. 6 is a diagram depicting an example of a watermark detection process. The detector segments the target image into blocks (e.g., 600, 602) and then performs a 2-dimensional fast fourier transform (2D FFT) on several blocks. This process yields 2D transforms of the magnitudes of the image contents of the blocks in the spatial frequency domain as depicted in the plot 604 shown in FIG. 6.

Next, the detector process performs a log polar remapping of each transformed block. The detector may add some of the blocks together to increase the watermark signal to noise ratio. The type of remapping in this implementation is referred to as a Fourier Mellin transform. The Fourier Mellin transform is a geometric transform that warps the image data from a frequency domain to a log polar coordinate system. As depicted in the plot 606 shown in FIG. 6, this transform sweeps through the transformed image data along a line at angle θ, mapping the data to a log polar coordinate system shown in the next plot 608. The log polar coordinate system has a rotation axis, representing the angle θ, and a scale axis. Inspecting the transformed data at this stage, one can see the orientation pattern of the watermark begin to be distinguishable from the noise component (i.e., the image signal).

Next, the detector performs a correlation 610 between the transformed image block and the transformed orientation pattern 612. At a high level, the correlation process slides the orientation pattern over the transformed image (in a selected transform domain, such as a spatial frequency domain) and measures the correlation at an array of discrete positions. Each such position has a corresponding scale and rotation parameter associated with it. Ideally, there is a position that clearly has the highest correlation relative to all of the others. In practice, there may be several candidates with a promising measure of correlation. As explained further below, these candidates may be subjected to one or more additional correlation stages to select the one that provides the best match.

There are a variety of ways to implement the correlation process. Any number of generalized matching filters may be implemented for this purpose. One such filter performs an FFT on the target and the orientation pattern, and multiplies the resulting arrays together to yield a multiplied FFT. Finally, it performs an inverse FFT on the multiplied FFT to return the data into its original log-polar domain. The position or positions within this resulting array with the highest magnitude represent the candidates with the highest correlation.

When there are several viable candidates, the detector can select a set of the top candidates and apply an additional correlation stage. Each candidate has a corresponding rotation and scale parameter. The correlation stage rotates and scales the FFT of the orientation pattern and performs a matching operation with the rotated and scaled pattern on the FFT of the target image. The matching operation multiplies the values of the transformed pattern with sample values at corresponding positions in the target image and accumulates the result to yield a measure of the correlation. The detector repeats this process for each of the candidates and picks the one with the highest measure of correlation. As shown in FIG. 6, the rotation and scale parameters (614) of the selected candidate are then used to find additional parameters that describe the orientation of the watermark in the target image.

The detector applies the scale and rotation to the target data block 616 and then performs another correlation process between the orientation pattern 618 and the scaled and rotated data block 616. The correlation process 620 is a generalized matching filter operation. It provides a measure of correlation for an array of positions that each has an associated translation parameter (e.g., an x,y position). Again, the detector may repeat the process of identifying promising candidates (i.e. those that reflect better correlation relative to others) and using those in an additional search for a parameter or set of orientation parameters that provide a better measure of correlation.

At this point, the detector has recovered the following orientation parameters: rotation, scale and translation. For many applications, these parameters may be sufficient to enable accurate reading of the watermark. In the read operation, the reader applies the orientation parameters to re-orient the target image and then proceeds to extract the watermark signal.

In some applications, the watermarked image may be stretched more in one spatial dimension than another. This type of distortion is sometimes referred to as differential scale or shear. Consider that the original image blocks are square. As a result of differential scale, each square may be warped into a parallelogram with unequal sides. Differential scale parameters define the nature and extent of this stretching.

There are several alternative ways to recover the differential scale parameters. One general class of techniques is to use the known parameters (e.g., the computed scale, rotation, and translation) as a starting point to find the differential scale parameters. Assuming the known parameters to be valid, this approach warps either the orientation pattern or the target image with selected amounts of differential scale and picks the differential scale parameters that yield the best correlation.

Another approach to determination of differential scale is set forth in application Ser. No. 09/452,022 (filed Nov. 30, 1999, and entitled Method and System for Determining Image Transformation).

2.2.2 Example Illustrating Reader Process

Figure 7:
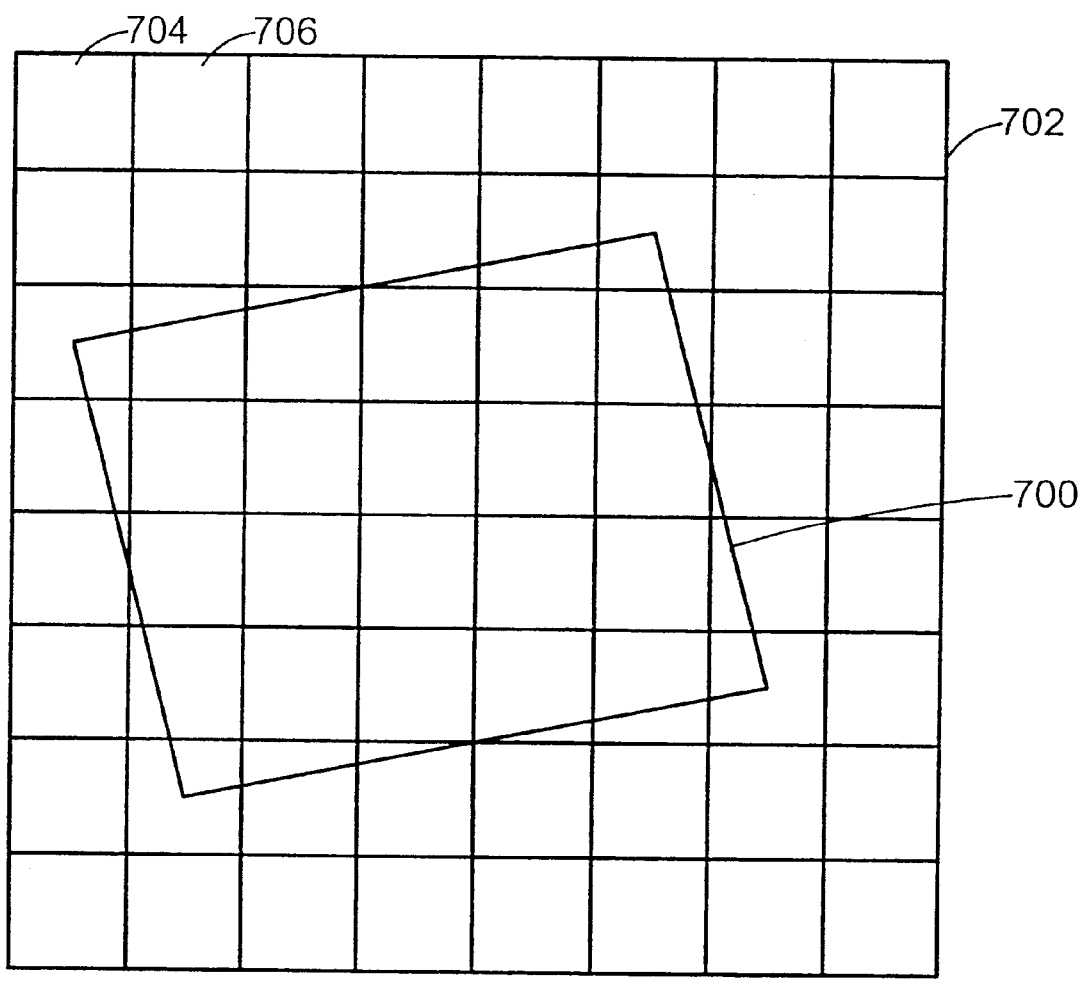
FIG. 7 is a diagram depicting the orientation of a transformed image superimposed over the original orientation of the image at the time of watermark encoding.

FIG. 7 is a diagram illustrating a re-oriented image 700 superimposed onto the original watermarked image 702. The difference in orientation and scale shows how the image was transformed and edited after the embedding process. The original watermarked image is sub-divided into tiles (e.g., pixel blocks 704, 706, etc.). When superimposed on the coordinate system of the original image 702 shown in FIG. 7, the target image blocks typically do not match the orientation of the original blocks.

The reader scans samples of the re-oriented image data, estimating the watermark information signal. It estimates the watermark information signal, in part, by predicting original sample values of the un-watermarked image. The reader then uses an inverted form of the watermarking function to estimate the watermark information signal from the watermarked signal and the predicted signal. This inverted watermarking function expresses the estimate of the watermark signal as a function of the predicted signal and the watermarked signal. Having an estimate of the watermark signal, it then uses the known relationship among the carrier signal, the watermark signal, and the raw bit to compute an estimate of the raw bit. Recall that samples in the watermark information signal are a function of the carrier signal and the raw bit value. Thus, the reader may invert this function to solve for an estimate of the raw bit value.

Recall that the embedder implementation discussed in connection with FIG. 2 redundantly encodes the watermark information signal in blocks of the input signal. Each raw bit may map to several samples within a block. In addition, the embedder repeats a mapping process for each of the blocks. As such, the reader generates several estimates of the raw bit value as it scans the watermarked image.

The information encoded in the raw bit string can be used to increase the accuracy of read operations. For instance, some of the raw bits act as signature bits that perform a validity checking function. Unlike unknown message bits, the reader knows the expected values of these signature bits. The reader can assess the validity of a read operation based on the extent to which the extracted signature bit values match the expected signature bit values. The estimates for a given raw bit value can then be given a higher weight depending on whether they are derived from a tile with a greater measure of validity.

3.0 Embedder Implementation

Figure 8:
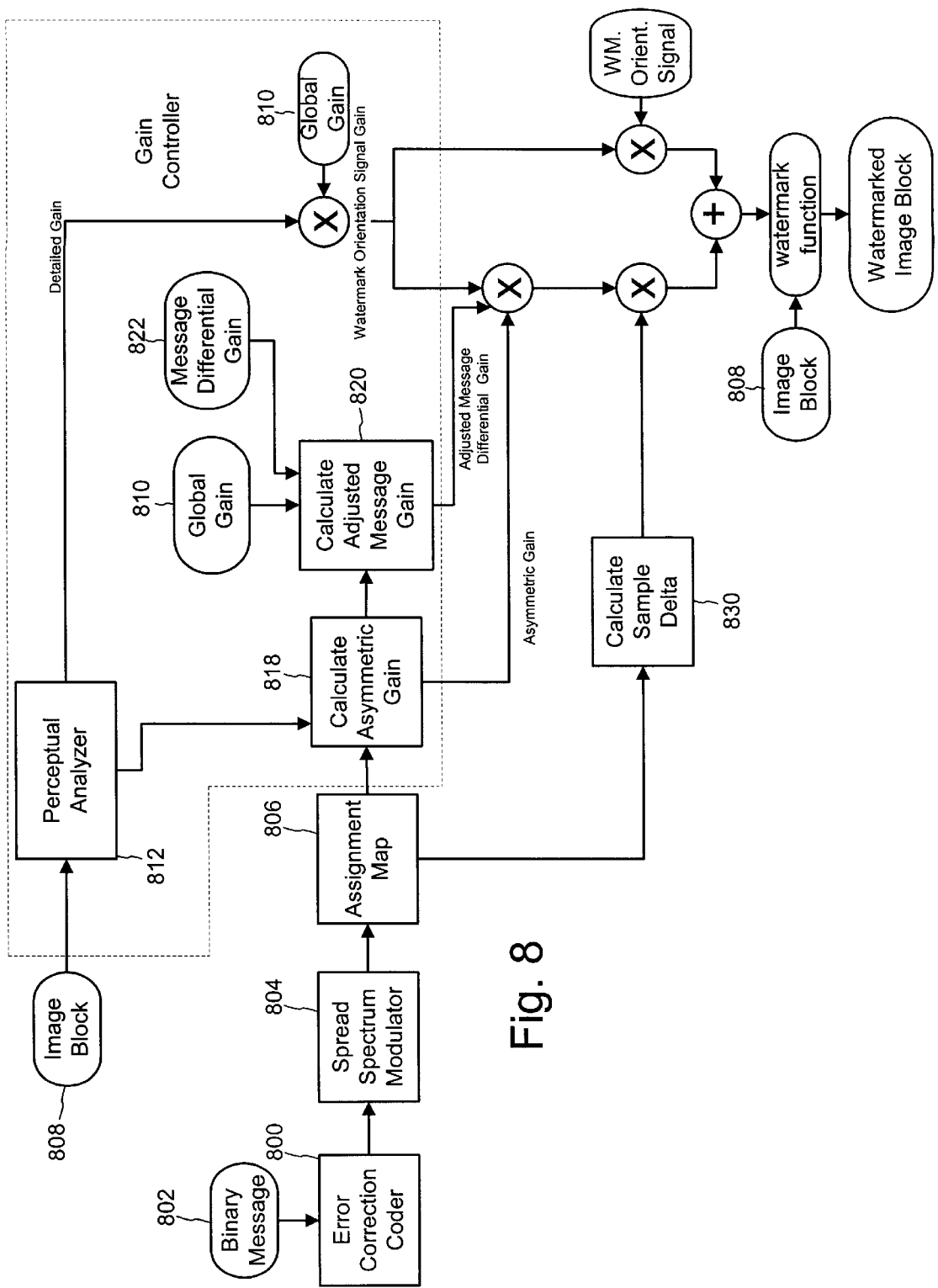
FIG. 8 is a diagram illustrating an implementation of a watermark embedder.

The following sections describe an implementation of the digital image watermark embedder depicted in FIG. 8. The embedder inserts two watermark components into the host image: a message component and a detection component (called the orientation pattern). The message component is defined in a spatial domain or other transform domain, while the orientation pattern is defined in a frequency domain. As explained later, the message component serves a dual function of conveying a message and helping to identify the watermark location in the image.

The embedder inserts the watermark message and orientation pattern in blocks of a selected color plane or planes (e.g., luminance or chrominance plane) of the host image. The message payload varies from one application to another, and can range from a single bit to the number of image samples in the domain in which it is embedded. The blocks may be blocks of samples in a spatial domain or some other transform domain.

3.1 Encoding the Message

The embedder converts binary message bits into a series of binary raw bits that it hides in the host image. As part of this process, a message encoder 800 appends certain known bits to the message bits 802. It performs an error detection process (e.g., parity, Cyclic Redundancy Check (CRC), etc.) to generate error detection bits and adds the error detection bits to the message. An error correction coding operation then generates raw bits from the combined known and message bit string.

For the error correction operation, the embedder may employ any of a variety of error correction codes such as Reed Solomon, BCH, convolution or turbo codes. The encoder may perform an M-ary modulation process on the message bits that maps groups of message bits to a message signal based on an M-ary symbol alphabet.

In one application of the embedder, the component of the message representing the known bits is encoded more redundantly than the other message bits. This is an example of a shorter message component having greater signal strength than a longer, weaker message component. The embedder gives priority to the known bits in this scheme because the reader uses them to verify that it has found the watermark in a potentially corrupted image, rather than a signal masquerading as the watermark.

3.2 Spread Spectrum Modulation

The embedder uses spread spectrum modulation as part of the process of creating a watermark signal from the raw bits. A spread spectrum modulator 804 spreads each raw bit into a number of "chips." The embedder generates a pseudo random number that acts as the carrier signal of the message. To spread each raw bit, the modulator performs an exclusive OR (XOR) operation between the raw bit and each bit of a pseudo random binary number of a pre-determined length. The length of the pseudo random number depends, in part, on the size of the message and the image. Preferably, the pseudo random number should contain roughly the same number of zeros and ones, so that the net effect of the raw bit on the host image block is zero. If a bit value in the pseudo random number is a one, the value of the raw bit is inverted. Conversely, if the bit value is a zero, then the value of the raw bit remains the same.

The length of the pseudorandom number may vary from one message bit or symbol to another. By varying the length of the number, some message bits can be spread more than others.

3.3 Scattering the Watermark Message

The embedder scatters each of the chips corresponding to a raw bit throughout an image block. An assignment map 806 assigns locations in the block to the chips of each raw bit. Each raw bit is spread over several chips. As noted above, an image block may represent a block of transform domain coefficients or samples in a spatial domain. The assignment map may be used to encode some message bits or symbols (e.g., groups of bits) more redundantly than others by mapping selected bits to more locations in the host signal than other message bits. In addition, it may be used to map different messages, or different components of the same message, to different locations in the host signal.

Figure 9:
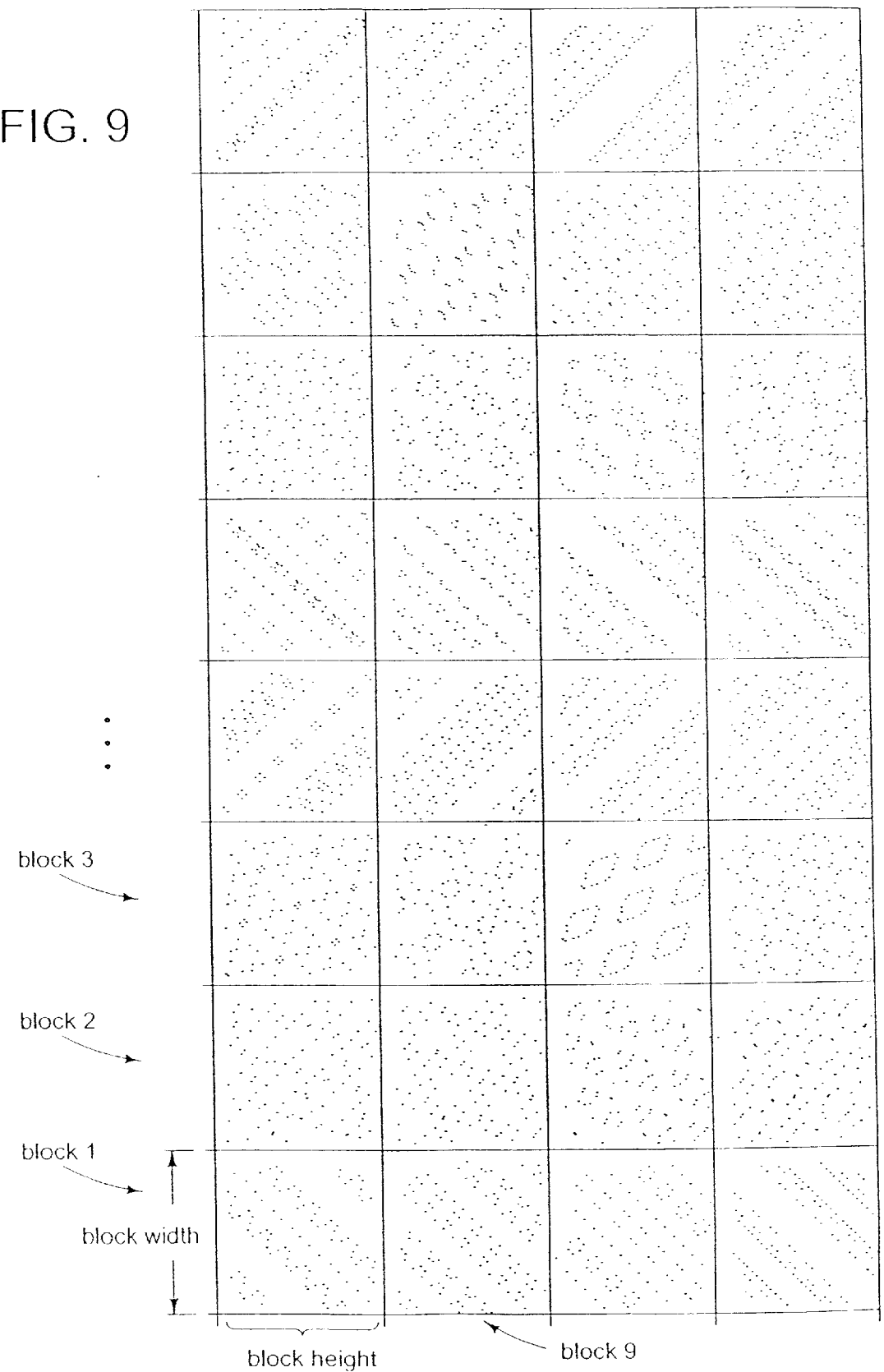
FIG. 9 is a diagram depicting an assignment map used to map raw bits in a message to locations within a host image.

FIG. 9 depicts an example of the assignment map. Each of the blocks in FIG. 9 correspond to an image block and depict a pattern of chips corresponding to a single raw bit. FIG. 9 depicts a total of 32 example blocks. The pattern within a block is represented as black dots on a white background. Each of the patterns is mutually exclusive such that each raw bit maps to a pattern of unique locations relative to the patterns of every other raw bit. Though not a requirement, the combined patterns, when overlapped, cover every location within the image block.

3.4 Gain Control and Perceptual Analysis

To insert the information carried in a chip to the host image, the embedder alters the corresponding sample value in the host image. In particular, for a chip having a value of one, it adds to the corresponding sample value, and for a chip having a value of zero, it subtracts from the corresponding sample value. A gain controller in the embedder adjusts the extent to which each chip adds or subtracts from the corresponding sample value.

The gain controller takes into account the orientation pattern when determining the gain. It applies a different gain to the orientation pattern than to the message component of the watermark. After applying the gain, the embedder combines the orientation pattern and message components together to form the composite watermark signal, and combines the composite watermark with the image block. One way to combine these signal components is to add them, but other linear or non-linear functions may be used as well.

Figure 10:
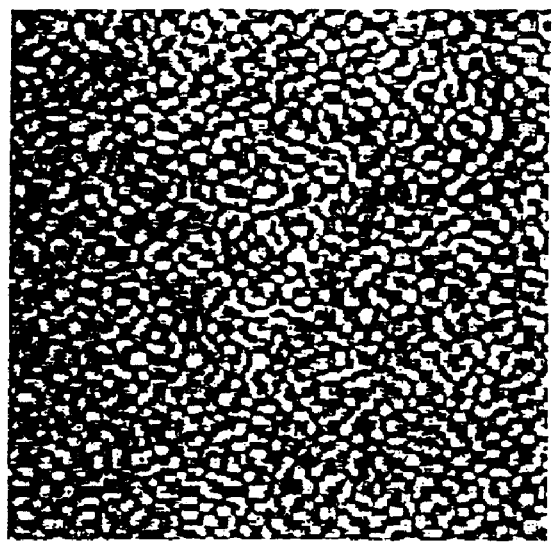
FIG. 10 illustrates an example of a watermark orientation signal in a spatial frequency domain.
Figure 11:
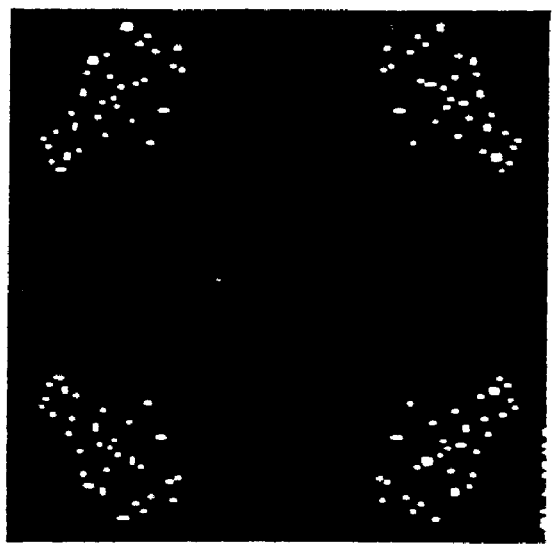
FIG. 11 illustrates the orientation signal shown in FIG. 10 in the spatial domain.

The orientation pattern is comprised of a pattern of quad symmetric impulse functions in the spatial frequency domain. In the spatial domain, these impulse functions look like cosine waves. An example of the orientation pattern is depicted in FIGS. 10 and 11. FIG. 10 shows the impulse functions as points in the spatial frequency domain, while FIG. 11 shows the orientation pattern in the spatial domain. Before adding the orientation pattern component to the message component, the embedder may transform the watermark components to a common domain. For example, if the message component is in a spatial domain and the orientation component is in a frequency domain, the embedder transforms the orientation component to a common spatial domain before combining them together.

FIG. 8 depicts the gain controller used in the embedder. Note that the gain controller operates on the blocks of image samples 808, the message watermark signal, and a global gain input 810, which may be specified by the user. A perceptual analyzer component 812 of the gain controller performs a perceptual analysis on the block to identify samples that can tolerate a stronger watermark signal without substantially impacting visibility. In places where the naked eye is less likely to notice the watermark, the perceptual analyzer increases the strength of the watermark. Conversely, it decreases the watermark strength where the eye is more likely to notice the watermark.

The perceptual analyzer shown in FIG. 8 performs a series of filtering operations on the image block to compute an array of gain values. There are a variety of filters suitable for this task. These filters include an edge detector filter that identifies edges of objects in the image, a non-linear filter to map gain values into a desired range, and averaging or median filters to smooth the gain values. Each of these filters may be implemented as a series of one-dimensional filters (one operating on rows and the other on columns) or two-dimensional filters. The size of the filters (i.e. the number of samples processed to compute a value for a given location) may vary (e.g., 3 by 3, 5 by 5, etc.). The shape of the filters may vary as well (e.g., square, cross-shaped, etc.). The perceptual analyzer process produces a detailed gain multiplier. The multiplier is a vector with elements corresponding to samples in a block.

Another component 818 of the gain controller computes an asymmetric gain based on the output of the image sample values and message watermark signal. This component analyzes the samples of the block to determine whether they are consistent with the message signal. The embedder reduces the gain for samples whose values relative to neighboring values are consistent with the message signal.

The embedder applies the asymmetric gain to increase the chances of an accurate read in the watermark reader. To understand the effect of the asymmetric gain, it is helpful to explain the operation of the reader. The reader extracts the watermark message signal from the watermarked signal using a predicted version of the original signal. It estimates the watermark message signal value based on values of the predicted signal and the watermarked signal at locations of the watermarked signal suspected of containing a watermark signal. There are several ways to predict the original signal. One way is to compute a local average of samples around the sample of interest. The average may be computed by taking the average of vertically adjacent samples, horizontally adjacent samples, an average of samples in a cross-shaped filter (both vertical and horizontal neighbors, an average of samples in a square-shaped filter, etc. The estimate may be computed one time based on a single predicted value from one of these averaging computations. Alternatively, several estimates may be computed based on two or more of these averaging computations (e.g., one estimate for vertically adjacent samples and another for horizontally adjacent samples). In the latter case, the reader may keep estimates if they satisfy a similarity metric. In other words, the estimates are deemed valid if they within a predetermined value or have the same polarity.

Knowing this behavior of the reader, the embedder computes the asymmetric gain as follows. For samples that have values relative to their neighbors that are consistent with the watermark signal, the embedder reduces the asymmetric gain. Conversely, for samples that are inconsistent with the watermark signal, the embedder increases the asymmetric gain. For example, if the chip value is a one, then the sample is consistent with the watermark signal if its value is greater than its neighbors. Alternatively, if the chip value is a zero, then the sample is consistent with the watermark signal if its value is less than its neighbors.

Another component 820 of the gain controller computes a differential gain, which represents an adjustment in the message vs. orientation pattern gains. As the global gain increases, the embedder emphasizes the message gain over the orientation pattern gain by adjusting the global gain by an adjustment factor. The inputs to this process 820 include the global gain 810 and a message differential gain 822. When the global gain is below a lower threshold, the adjustment factor is one. When the global gain is above an upper threshold, the adjustment factor is set to an upper limit greater than one. For global gains falling within the two thresholds, the adjustment factor increases linearly between one and the upper limit. The message differential gain is the product of the adjustment factor and the global gain.

At this point there are four sources of gain: the detailed gain, the global gain, the asymmetric gain, and the message dependent gain. The embedder applies the first two gain quantities to both the message and orientation watermark signals. It only applies the latter two to the message watermark signal. FIG. 8 depicts how the embedder applies the gain to the two watermark components. First, it multiplies the detailed gain with the global gain to compute the orientation pattern gain. It then multiplies the orientation pattern gain with the adjusted message differential gain and asymmetric gain to form the composite message gain.

Finally, the embedder forms the composite watermark signal. It multiplies the composite message gain with the message signal, and multiplies the orientation pattern gain with the orientation pattern signal. It then combines the result in a common transform domain to get the composite watermark. The embedder applies a watermarking function to combine the composite watermark to the block to create a watermarked image block. The message and orientation components of the watermark may be combined by mapping the message bits to samples of the orientation signal, and modulating the samples of the orientation signal to encode the message.

The embedder computes the watermark message signal by converting the output of the assignment map 806 to delta values, indicating the extent to which the watermark signal changes the host signal. As noted above, a chip value of one corresponds to an upward adjustment of the corresponding sample, while a chip value of zero corresponds to a downward adjustment. The embedder specifies the specific amount of adjustment by assigning a delta value to each of the watermark message samples (830).

4.0 Detector Implementation

Figure 12:
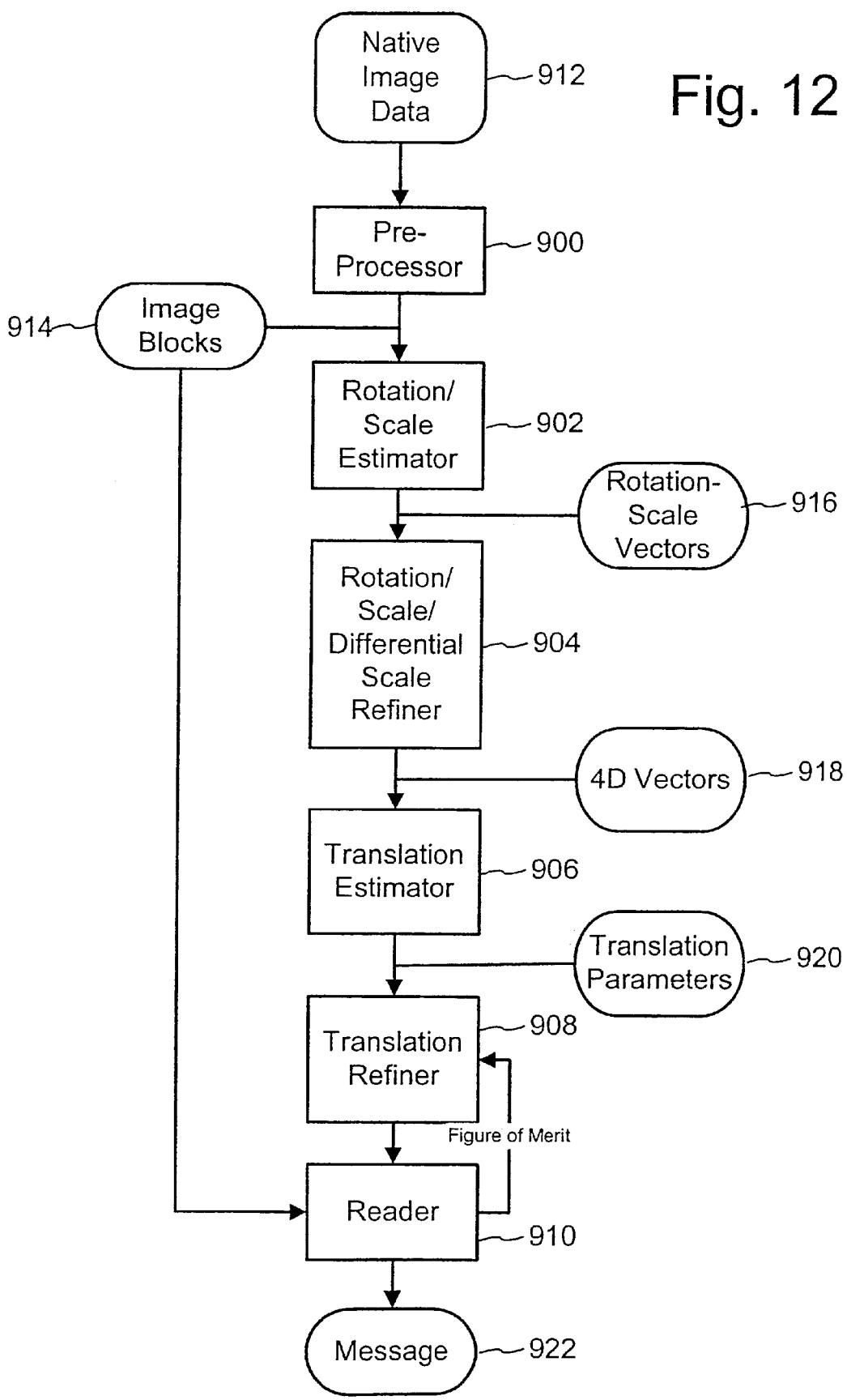
FIG. 12 is a diagram illustrating an overview of a watermark detector implementation.

FIG. 12 illustrates an overview of a watermark detector that detects the presence of a detection watermark in a host image and its orientation. Using the orientation pattern and the known bits inserted in the watermark message, the detector determines whether a potentially corrupted image contains a watermark, and if so, its orientation in the image.

Recall that the composite watermark is replicated in blocks of the original image. After an embedder places the watermark in the original digital image, the watermarked image is likely to undergo several transformations, either from routine processing or from intentional tampering. Some of these transformations include: compression, decompression, color space conversion, digital to analog conversion, printing, scanning, analog to digital conversion, scaling, rotation, inversion, flipping differential scale, and lens distortion. In addition to these transformations, various noise sources can corrupt the watermark signal, such as fixed pattern noise, thermal noise, etc.

When building a detector implementation for a particular application, the developer may implement counter-measures to mitigate the impact of the types of transformations, distortions and noise expected for that application. Some applications may require more counter-measures than others. The detector described below is designed to recover a watermark from a watermarked image after the image has been printed, and scanned. The following sections describe the counter-measures to mitigate the impact of various forms of corruption. The developer can select from among these counter-measures when implementing a detector for a particular application.

For some applications, the detector will operate in a system that provides multiple image frames of a watermarked object. One typical example of such a system is a computer equipped with a digital camera. In such a configuration, the digital camera can capture a temporal sequence of images as the user or some device presents the watermarked image to the camera.

As shown in FIG. 12, the principal components of the detector are: 1) pre-processor 900; 2) rotation and scale estimator 902; 3) orientation parameter refiner 904; 4) translation estimator 906; 5) translation refiner 908; and reader 910.

The preprocessor 900 takes one or more frames of image data 912 and produces a set of image blocks 914 prepared for further analysis. The rotation-scale estimator 902 computes rotation-scale vectors 916 that estimate the orientation of the orientation signal in the image blocks. The parameter refiner 904 collects additional evidence of the orientation signal and further refines the rotation scale vector candidates by estimating differential scale parameters. The result of this refining stage is a set of 4D vectors candidates 918 (rotation, scale, and two differential scale parameters). The translation estimator 906 uses the 4D vector candidates to re-orient image blocks with promising evidence of the orientation signal. It then finds estimates of translation parameters 920. The translation refiner 908 invokes the reader 910 to assess the merits of an orientation vector. When invoked by the detector, the reader uses the orientation vector to approximate the original orientation of the host image and then extracts values for the known bits in the watermark message. The detector uses this information to assess the merits of and refine orientation vector candidates.

By comparing the extracted values of the known bits with the expected values, the reader provides a figure of merit for an orientation vector candidate. The translation refiner then picks a 6D vector, including rotation, scale, differential scale and translation, that appears likely produce a valid read of the watermark message 922. The following sections describe implementations of these components in more detail.

4.1 Detector Pre-processing

Figure 13:
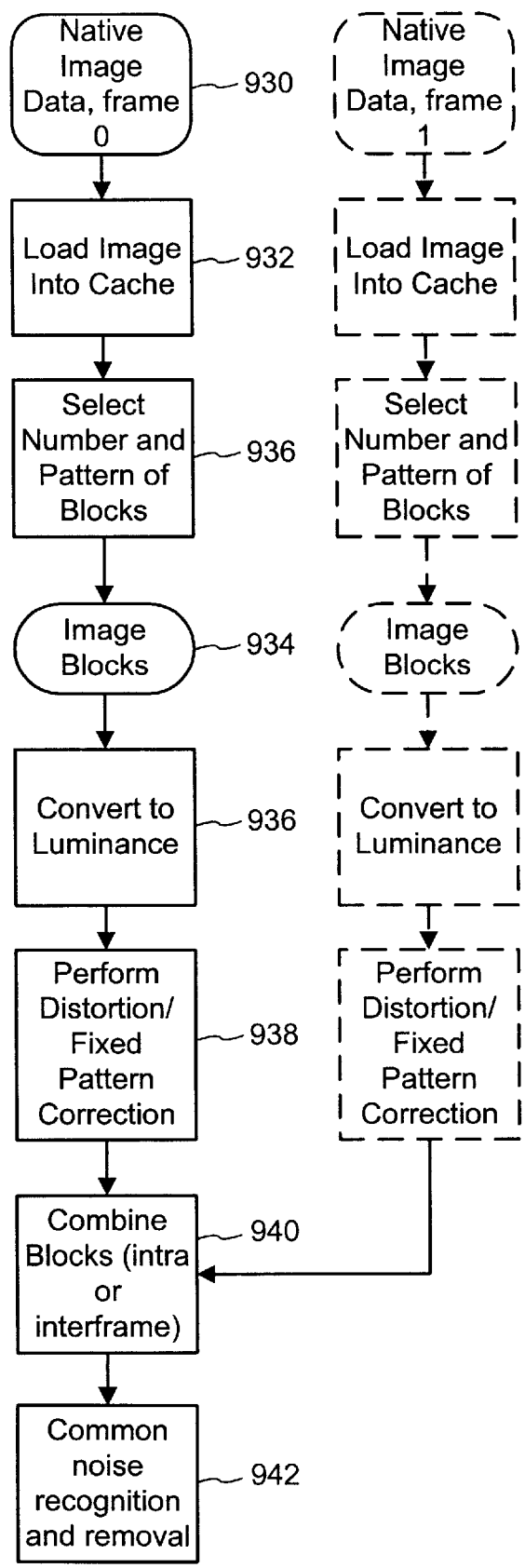
FIG. 13 is a diagram illustrating an implementation of the detector pre-processor depicted generally in FIG. 12.

FIG. 13 is a flow diagram illustrating preprocessing operations in the detector shown in FIG. 12. The detector performs a series of pre-processing operations on the native image 930 to prepare the image data for further analysis. It begins by filling memory with one or more frames of native image data (932), and selecting sets of pixel blocks 934 from the native image data for further analysis (936). While the detector can detect a watermark using a single image frame, it also has support for detecting the watermark using additional image frames. As explained below, the use of multiple frames has the potential for increasing the chances of an accurate detection and read.

In applications where a camera captures an input image of a watermarked object, the detector may be optimized to address problems resulting from movement of the object. Typical PC cameras, for example, are capable of capturing images at a rate of at least 10 frames a second. A frustrated user might attempt to move the object in an attempt to improve detection. Rather than improving the chances of detection, the movement of the object changes the orientation of the watermark from one frame to the next, potentially making the watermark more difficult to detect. One way to address this problem is to buffer one or more frames, and then screen the frame or frames to determine if they are likely to contain a valid watermark signal. If such screening indicates that a frame is not likely to contain a valid signal, the detector can discard it and proceed to the next frame in the buffer, or buffer a new frame. Another enhancement is to isolate portions of a frame that are most likely to have a valid watermark signal, and then perform more detailed detection of the isolated portions.

After loading the image into the memory, the detector selects image blocks 934 for further analysis. It is not necessary to load or examine each block in a frame because it is possible to extract the watermark using only a portion of an image. The detector looks at only a subset of the samples in an image, and preferably analyzes samples that are more likely to have a recoverable watermark signal.

The detector identifies portions of the image that are likely to have the highest watermark signal to noise ratio. It then attempts to detect the watermark signal in the identified portions. In the context of watermark detection, the host image is considered to be a source of noise along with conventional noise sources. While it is typically not practical to compute the signal to noise ratio, the detector can evaluate attributes of the signal that are likely to evince a promising watermark signal to noise ratio. These properties include the signal activity (as measured by sample variance, for example), and a measure of the edges (abrupt changes in image sample values) in an image block. Preferably, the signal activity of a candidate block should fall within an acceptable range, and the block should not have a high concentration of strong edges. One way to quantify the edges in the block is to use an edge detection filter (e.g., a LaPlacian, Sobel, etc.).

In one implementation, the detector divides the input image into blocks, and analyzes each block based on predetermined metrics. It then ranks the blocks according to these metrics. The detector then operates on the blocks in the order of the ranking. The metrics include sample variance in a candidate block and a measure of the edges in the block. The detector combines these metrics for each candidate block to compute a rank representing the probability that it contains a recoverable watermark signal.

In another implementation, the detector selects a pattern of blocks and evaluates each one to try to make the most accurate read from the available data. In either implementation, the block pattern and size may vary. This particular implementation selects a pattern of overlapping blocks (e.g., a row of horizontally aligned, overlapping blocks). One optimization of this approach is to adaptively select a block pattern that increases the signal to noise ratio of the watermark signal. While shown as one of the initial operations in the preparation, the selection of blocks can be postponed until later in the pre-processing stage.

Next, the detector performs a color space conversion on native image data to compute an array of image samples in a selected color space for each block (936). In the following description, the color space is luminance, but the watermark may be encoded in one or more different color spaces. The objective is to get a block of image samples with lowest noise practical for the application. While the implementation currently performs a row by row conversion of the native image data into 8 bit integer luminance values, it may be preferable to convert to floating-point values for some applications. One optimization is to select a luminance converter that is adapted for the sensor used to capture the digital input image. For example, one might experimentally derive the lowest noise luminance conversion for commercially available sensors, e.g., CCD cameras or scanners, CMOS cameras, etc. Then, the detector could be programmed to select either a default luminance converter, or one tuned to a specific type of sensor.

At one or more stages of the detector, it may be useful to perform operations to mitigate the impact of noise and distortion. In the pre-processing phase, for example, it may be useful to evaluate fixed pattern noise and mitigate its effect (938). The detector may look for fixed pattern noise in the native input data or the luminance data, and then mitigate it.

One way to mitigate certain types of noise is to combine data from different blocks in the same frame, or corresponding blocks in different frames 940. This process helps augment the watermark signal present in the blocks, while reducing the noise common to the blocks. For example, merely adding blocks together may mitigate the effects of common noise.

In addition to common noise, other forms of noise may appear in each of the blocks such as noise introduced in the printing or scanning processes. Depending on the nature of the application, it may be advantageous to perform common noise recognition and removal at this stage 942. The developer may select a filter or series of filters to target certain types of noise that appear during experimentation with images. Certain types of median filters may be effective in mitigating the impact of spectral peaks (e.g., speckles) introduced in printing or scanning operations.

In addition to introducing noise, the printing and image capture processes may transform the color or orientation of the original, watermarked image. As described above, the embedder typically operates on a digital image in a particular color space and at a desired resolution. The watermark embedders normally operate on digital images represented in an RGB or CYMK color space at a desired resolution (e.g., 100 dpi or 300 dpi, the resolution at which the image is printed). The images are then printed on paper with a screen printing process that uses the CYMK subtractive color space at a line per inch (LPI) ranging from 65–200. 133 lines/in is typical for quality magazines and 73 lines/in is typical for newspapers. In order to produce a quality image and avoid pixelization, the rule of thumb is to use digital images with a resolution that is at least twice the press resolution. This is due to the half tone printing for color production. Also, different presses use screens with different patterns and line orientations and have different precision for color registration.

One way to counteract the transforms introduced through the printing process is to develop a model that characterizes these transforms and optimize watermark embedding and detecting based on this characterization. Such a model may be developed by passing watermarked and unwatermarked images through the printing process and observing the changes that occur to these images. The resulting model characterizes the changes introduced due to the printing process. The model may represent a transfer function that approximates the transforms due to the printing process. The detector then implements a pre-processing stage that reverses or at least mitigates the effect of the printing process on watermarked images. The detector may implement a pre-processing stage that performs the inverse of the transfer function for the printing process.

A related challenge is the variety in paper attributes used in different printing processes. Papers of various qualities, thickness and stiffness, absorb ink in various ways. Some papers absorb ink evenly, while others absorb ink at rates that vary with the changes in the paper's texture and thickness. These variations may degrade the embedded watermark signal when a digitally watermarked image is printed. The watermark process can counteract these effects by classifying and characterizing paper so that the embedder and reader can compensate for this printing-related degradation.

Variations in image capture processes also pose a challenge. In some applications, it is necessary to address problems introduced due to interlaced image data. Some video camera produce interlaced fields representing the odd or even scan lines of a frame. Problems arise when the interlaced image data consists of fields from two consecutive frames. To construct an entire frame, the preprocessor may combine the fields from consecutive frames while dealing with the distortion due to motion that occurs from one frame to the next. For example, it may be necessary to shift one field before interleaving it with another field to counteract inter-frame motion. A de-blurring function may be used to mitigate the blurring effect due to the motion between frames.

Another problem associated with cameras in some applications is blurring due to the lack of focus. The preprocessor can mitigate this effect by estimating parameters of a blurring function and applying a de-blurring function to the input image.

Yet another problem associated with cameras is that they tend to have color sensors that utilize different color pattern implementations. As such, a sensor may produce colors slightly different than those represented in the object being captured. Most CCD and CMOS cameras use an array of sensors to produce colored images. The sensors in the array are arranged in clusters of sensitive to three primary colors red, green, and blue according to a specific pattern. Sensors designated for a particular color are dyed with that color to increase their sensitivity to the designated color. Many camera manufacturers use a Bayer color pattern GR/BG. While this pattern produces good image quality, it causes color mis-registration that degrades the watermark signal. Moreover, the color space converter, which maps the signal from the sensors to another color space such as YUV or RGB, may vary from one manufacturer to another. One way to counteract the mis-registration of the camera's color pattern is to account for the distortion due to the pattern in a color transformation process, implemented either within the camera itself, or as a pre-processing function in the detector.

Another challenge in counteracting the effects of the image capture process is dealing with the different types of distortion introduced from various image capture devices. For example, cameras have different sensitivities to light. In addition, their lenses have different spherical distortion, and noise characteristics. Some scanners have poor color reproduction or introduce distortion in the image aspect ratio. Some scanners introduce aliasing and employ interpolation to increase resolution. The detector can counteract these effects in the pre-processor by using an appropriate inverse transfer function. An off-line process first characterizes the distortion of several different image capture devices (e.g., by passing test images through the scanner and deriving a transfer function modeling the scanner distortion). Some detectors may be equipped with a library of such inverse transfer functions from which they select one that corresponds to the particular image capture device Yet another challenge in applications where the image is printed on paper and later scanned is that the paper deteriorates over time and degrades the watermark. Also, varying lighting conditions make the watermark difficult to detect. Thus, the watermark may be selected so as to be more impervious to expected deterioration, and recoverable over a wider range of lighting conditions.

At the close of the pre-processing stage, the detector has selected a set of blocks for further processing. It then proceeds to gather evidence of the orientation signal in these blocks, and estimate the orientation parameters of promising orientation signal candidates. Since the image may have suffered various forms of corruption, the detector may identify several parts of the image that appear to have attributes similar to the orientation signal. As such, the detector may have to resolve potentially conflicting and ambiguous evidence of the orientation signal. To address this challenge, the detector estimates orientation parameters, and then refines theses estimates to extract the orientation parameters that are more likely to evince a valid signal than other parameter candidates.

4.2 Estimating Initial Orientation Parameters

Figure 14:
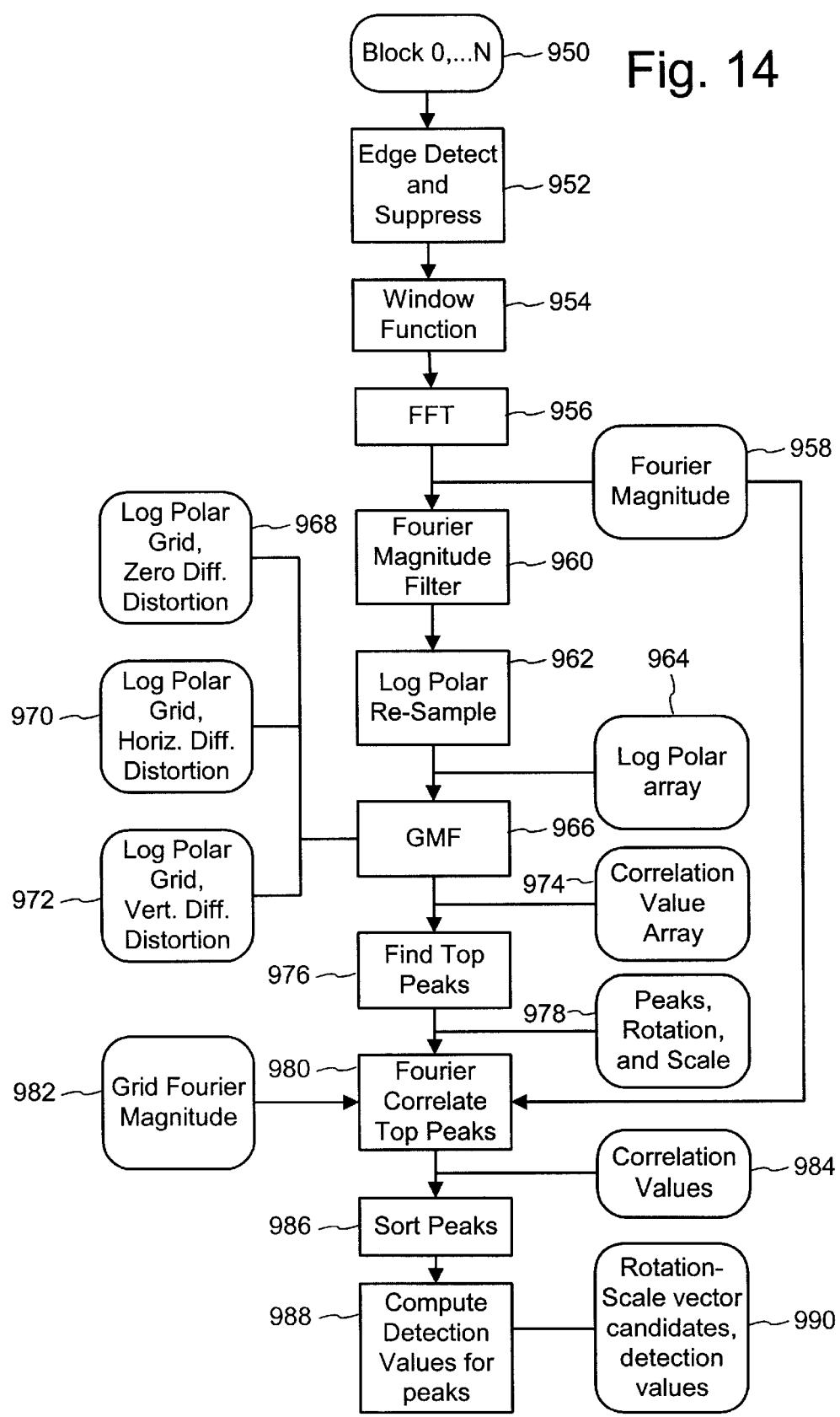
FIG. 14 is a diagram illustrating a process for estimating rotation and scale vectors of a detection watermark signal.

FIG. 14 is a flow diagram illustrating a process for estimating rotation-scale vectors. The detector loops over each image block (950), calculating rotation-scale vectors with the best detection values in each block. First, the detector filters the block in a manner that tends to amplify the orientation signal while suppressing noise, including noise from the host image itself (952). Implemented as a multi-axis LaPlacian filter, the filter highlights edges (e.g., high frequency components of the image) and then suppresses them. The term, "multi-axis," means that the filter includes a series of stages that each operates on particular axis. First, the filter operates on the rows of luminance samples, then operates on the columns, and adds the results. The filter may be applied along other axes as well. Each pass of the filter produces values at discrete levels. The final result is an array of samples, each having one of five values: $\{-2, -1, 0, 1, 2\}$.

Next, the detector performs a windowing operation on the block data to prepare it for an FFT transform (954). This windowing operation provides signal continuity at the block edges. The detector then performs an FFT (956) on the block, and retains only the magnitude component (958).

In an alternative implementation, the detector may use the phase signal produced by the FFT to estimate the translation parameter of the orientation signal. For example, the detector could use the rotation and scale parameters extracted in the process described below, and then compute the phase that provided the highest measure of correlation with the orientation signal using the phase component of the FFT process.

After computing the FFT, the detector applies a Fourier magnitude filter (960) on the magnitude components. The filter in the implementation slides over each sample in the Fourier magnitude array and filters the sample's eight neighbors in a square neighborhood centered at the sample. The filter boosts values representing a sharp peak with a rapid fall-off, and suppresses the fall-off portion. It also performs a threshold operation to clip peaks to an upper threshold.

Next, the detector performs a log-polar re-sample (962) of the filtered Fourier magnitude array to produce a log-polar array 964. This type of operation is sometimes referred to as a Fourier Mellin transform. The detector, or some off-line pre-processor, performs a similar operation on the orientation signal to map it to the log-polar coordinate system. Using matching filters, the detector implementation searches for a orientation signal in a specified window of the log-polar coordinate system. For example, consider that the log-polar coordinate system is a two dimensional space with the scale being the vertical axis and the angle being the horizontal axis. The window ranges from 0 to 90 degrees on the horizontal axis and from approximately 50 to 2400 dpi on the vertical axis. Note that the orientation pattern should be selected so that routine scaling does not push the orientation pattern out of this window. The orientation pattern can be designed to mitigate this problem, as noted above, and as explained in co-pending patent application Ser. No. 60/136,572, filed May 28, 1999, by Ammon Gustafson, entitled Watermarking System With Improved Technique for Detecting Scaling and Rotation, filed May 28, 1999.

The detector proceeds to correlate the orientation and the target signal in the log polar coordinate system. As shown in FIG. 14, the detector uses a generalized matched filter GMF (966). The GMF performs an FFT on the orientation and target signal, multiplies the resulting Fourier domain entities, and performs an inverse FFT. This process yields a rectangular array of values in log-polar coordinates, each representing a measure of correlation and having a corresponding rotation angle and scale vector. As an optimization, the detector may also perform the same correlation operations for distorted versions (968, 970, 972) of the orientation signal to see if any of the distorted orientation patterns results in a higher measure of correlation. For example, the detector may repeat the correlation operation with some pre-determined amount of horizontal and vertical differential distortion (970, 972). The result of this correlation process is an array of correlation values 974 specifying the amount of correlation that each corresponding rotation-scale vector provides.

The detector processes this array to find the top M peaks and their location in the log-polar space 976. To extract the location more accurately, the detector uses interpolation to provide the inter-sample location of each of the top peaks 978. The interpolator computes the 2D median of the samples around a peak and provides the location of the peak center to an accuracy of 0.1 sample.

The detector proceeds to rank the top rotation-scale vectors based on yet another correlation process 980. In particular, the detector performs a correlation between a Fourier magnitude representation for each rotation-scale vector candidate and a Fourier magnitude specification of the orientation signal 982. Each Fourier magnitude representation is scaled and rotated by an amount reflected by the corresponding rotation-scale vector. This correlation operation sums a point-wise multiplication of the orientation pattern impulse functions in the frequency domain with the Fourier magnitude values of the image at corresponding frequencies to compute a measure of correlation for each peak 984. The detector then sorts correlation values for the peaks (986).

Finally, the detector computes a detection value for each peak (988). It computes the detection value by quantizing the correlation values. Specifically, it computes a ratio of the peak's correlation value and the correlation value of the next largest peak. Alternatively, the detector may compute the ratio of the peak's correlation value and a sum or average of the correlation values of the next n highest peaks, where n is some predetermined number. Then, the detector maps this ratio to a detection value based on a statistical analysis of unmarked images.

The statistical analysis plots a distribution of peak ratio values found in unmarked images. The ratio values are mapped to a detection value based on the probability that the value came from an unmarked image. For example, 90% of the ratio values in unmarked images fall below a first threshold T1, and thus, the detection value mapping for a ratio of T1 is set to 1. Similarly, 99% of the ratio values in unmarked images fall below T2, and therefore, the detection value is set to 2. 99.9% of the ratio values in unmarked images fall below T3, and the corresponding detection value is set to 3. The threshold values, T1, T2 and T3, may be determined by performing a statistical analysis of several images. The mapping of ratios to detection values based on the statistical distribution may be implemented in a look up table.

The statistical analysis may also include a maximum likelihood analysis. In such an analysis, an off-line detector generates detection value statistics for both marked and unmarked images. Based on the probability distributions of marked and unmarked images, it determines the likelihood that a given detection value for an input image originates from a marked and unmarked image.

Figure 15:
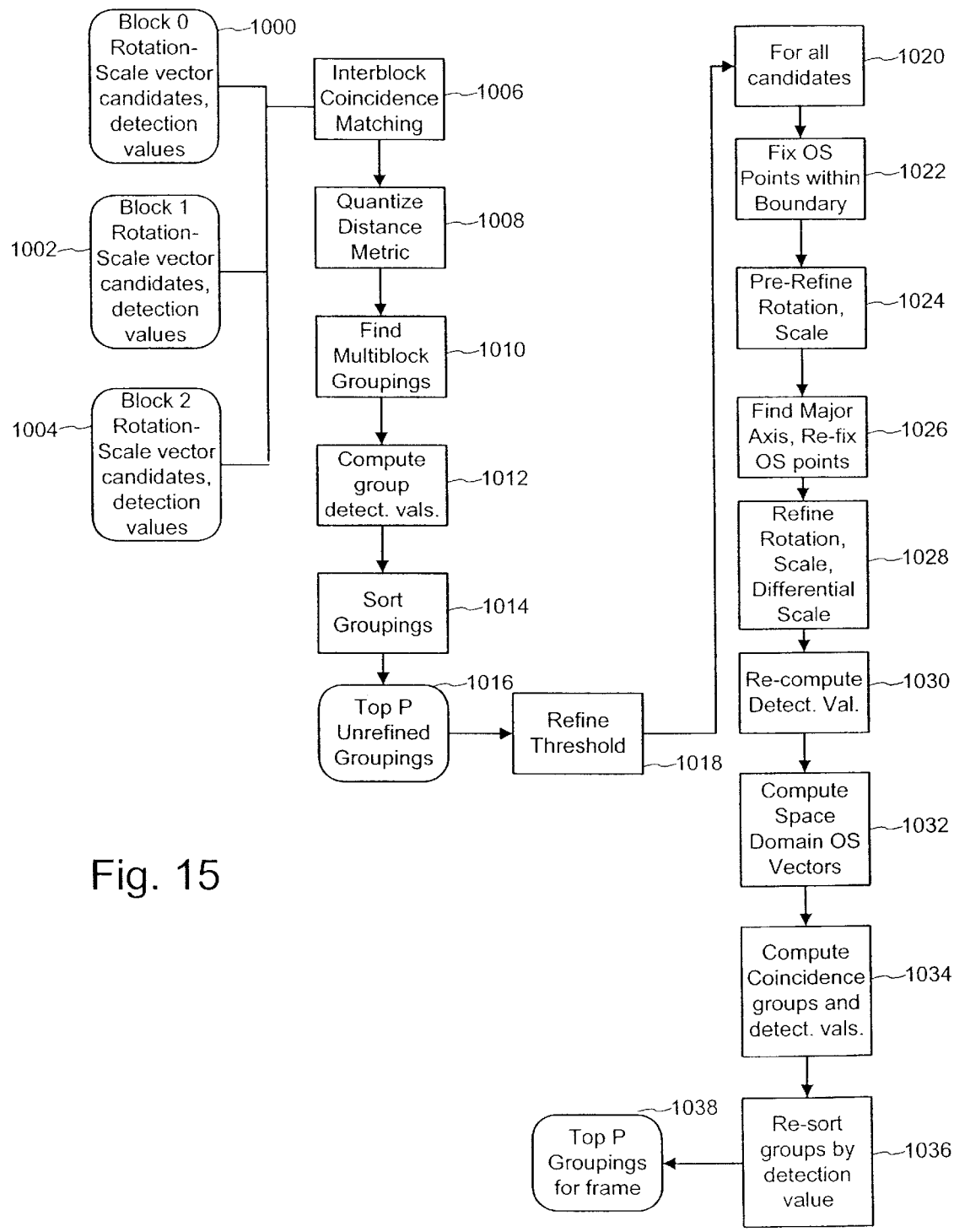
FIG. 15 is a diagram illustrating a process for refining the rotation and scale vectors, and for estimating differential scale parameters of the detection watermark signal.

At the end of these correlation stages, the detector has computed a ranked set of rotation-scale vectors 990, each with a quantized measure of correlation associated with it. At this point, the detector could simply choose the rotation and scale vectors with the highest rank and proceed to compute other orientation parameters, such as differential scale and translation. Instead, the detector gathers more evidence to refine the rotation-scale vector estimates. FIG. 15 is a flow diagram illustrating a process for refining the orientation parameters using evidence of the orientation signal collected from blocks in the current frame.

Continuing in the current frame, the detector proceeds to compare the rotation and scale parameters from different blocks (e.g., block 0, block 1, block 2; 1000, 1002, and 1004 in FIG. 15). In a process referred to as interblock coincidence matching 1006, it looks for similarities between rotation-scale parameters that yielded the highest correlation in different blocks. To quantify this similarity, it computes the geometric distance between each peak in one block with every other peak in the other blocks. It then computes the probability that peaks will fall within this calculated distance. There are a variety of ways to calculate the probability. In one implementation, the detector computes the geometric distance between two peaks, computes the circular area encompassing the two peaks ($\pi$(geometric distance)$^2$), and computes the ratio of this area to the total area of the block. Finally, it quantizes this probability measure for each pair of peaks (1008) by computing the log (base 10) of the ratio of the total area over the area encompassing the two peaks. At this point, the detector has calculated two detection values: quantized peak value, and the quantized distance metric.

The detector now forms multi-block grouping of rotation-scale vectors and computes a combined detection value for each grouping (1010). The detector groups vectors based on their relative geometric proximity within their respective blocks. It then computes the combined detection value by combining the detection values of the vectors in the group (1012). One way to compute a combined detection value is to add the detection values or add a weighted combination of them.

Having calculated the combined detection values, the detector sorts each grouping by its combined detection value (1014). This process produces a set of the top groupings of unrefined rotation-scale candidates, ranked by detection value 1016. Next, the detector weeds out rotation-scale vectors that are not promising by excluding those groupings whose combined detection values are below a threshold (the "refine threshold" 1018). The detector then refines each individual rotation-scale vector candidate within the remaining groupings.

The detector refines a rotation-scale vector by adjusting the vector and checking to see whether the adjustment results in a better correlation. As noted above, the detector may simply pick the best rotation-scale vector based on the evidence collected thus far, and refine only that vector. An alternative approach is to refine each of the top rotation-scale vector candidates, and continue to gather evidence for each candidate. In this approach, the detector loops over each vector candidate (1020), refining each one.

One approach of refining the orientation vector is as follows:

fix the orientation signal impulse functions ("points") within a valid boundary (1022);

pre-refine the rotation-scale vector (1024);

find the major axis and re-fix the orientation points (1026); and refine each vector with the addition of a differential scale component (1028).

In this approach, the detector pre-refines a rotation-scale vector by incrementally adjusting one of the parameters (scale, rotation angle), adjusting the orientation points, and then summing a point-wise multiplication of the orientation pattern and the image block in the Fourier magnitude domain. The refiner compares the resulting measure of correlation with previous measures and continues to adjust one of the parameters so long as the correlation increases. After refining the scale and rotation angle parameters, the refiner finds the major axis, and re-fixes the orientation points. It then repeats the refining process with the introduction of differential scale parameters. At the end of this process, the refiner has converted each scale-rotation candidate to a refined 4D vector, including rotation, scale, and two differential scale parameters.

At this stage, the detector can pick a 4D vector or set of 4D vector and proceed to calculate the final remaining parameter, translation. Alternatively, the detector can collect additional evidence about the merits of each 4D vector.

One way to collect additional evidence about each 4D vector is to re-compute the detection value of each orientation vector candidate (1030). For example, the detector may quantize the correlation value associated with each 4D vector as described above for the rotation-scale vector peaks (see item 988, FIG. 14 and accompanying text). Another way to collect additional evidence is to repeat the coincidence matching process for the 4D vectors. For this coincidence matching process, the detector computes spatial domain vectors for each candidate (1032), determines the distance metric between candidates from different blocks, and then groups candidates from different blocks based on the distance metrics (1034). The detector then re-sorts the groups according to their combined detection values (1036) to produce a set of the top P groupings 1038 for the frame.

Figure 16:
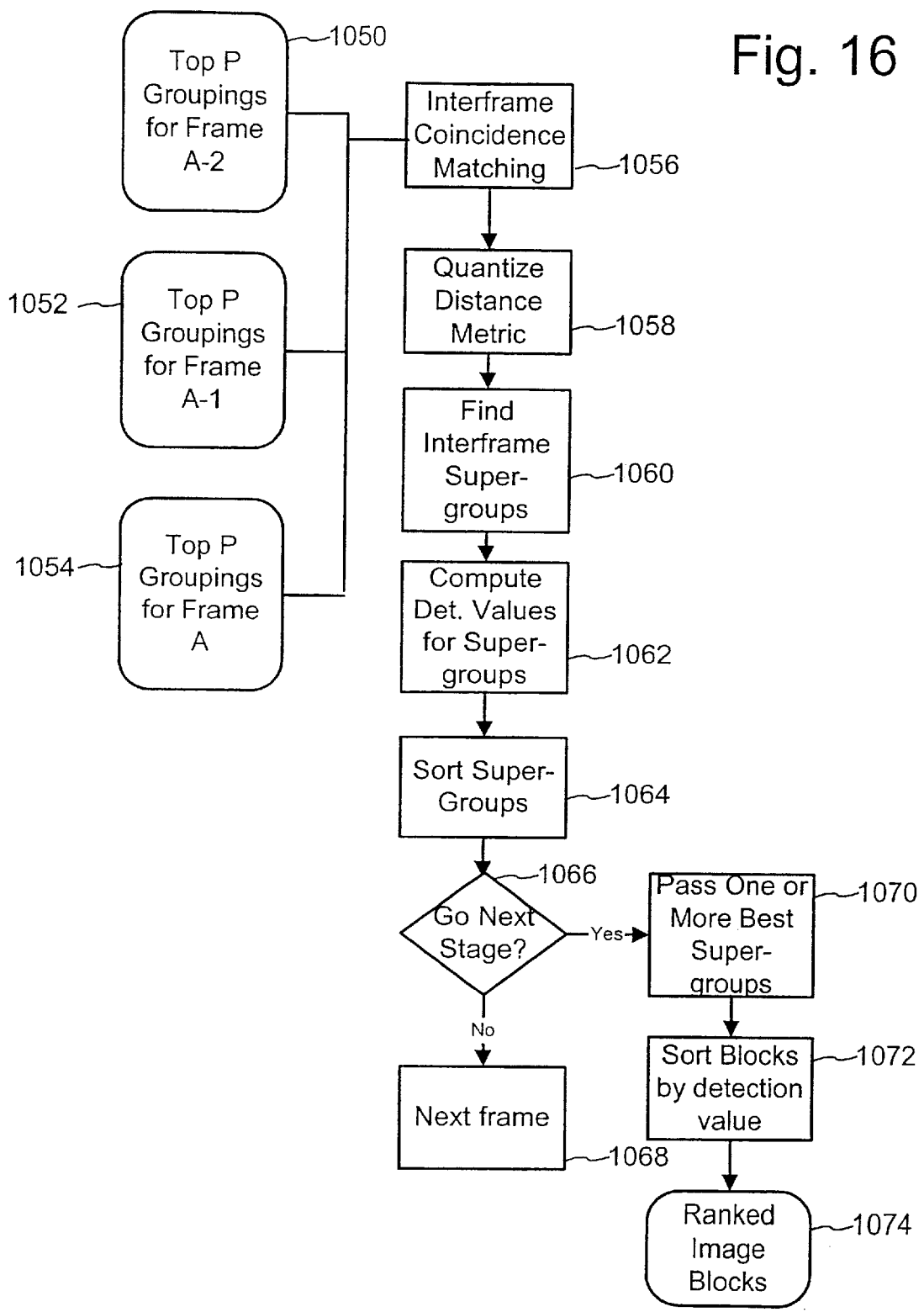
FIG. 16 is a diagram illustrating a process for aggregating evidence of the orientation signal and orientation parameter candidates from two or more frames.

FIG. 16 is a flow diagram illustrating a method for aggregating evidence of the orientation signal from multiple frames. In applications with multiple frames, the detector collects the same information for orientation vectors of the selected blocks in each frame (namely, the top P groupings of orientation vector candidates, e.g., 1050, 1052 and 1054). The detector then repeats coincidence matching between orientation vectors of different frames (1056). In particular, in this inter-frame mode, the detector quantizes the distance metrics computed between orientation vectors from blocks in different frames (1058). It then finds inter-frame groupings of orientation vectors (super-groups) using the same approach described above (1060), except that the orientation vectors are derived from blocks in different frames. After organizing orientation vectors into super-groups, the detector computes a combined detection value for each super-group (1062) and sorts the super-groups by this detection value (1064). The detector then evaluates whether to proceed to the next stage (1066), or repeat the above process of computing orientation vector candidates from another frame (1068).

If the detection values of one or more super-groups exceed a threshold, then the detector proceeds to the next stage. If not, the detector gathers evidence of the orientation signal from another frame and returns to the inter-frame coincidence matching process. Ultimately, when the detector finds sufficient evidence to proceed to the next stage, it selects the super-group with the highest combined detection value (1070), and sorts the blocks based on their corresponding detection values (1072) to produce a ranked set of blocks for the next stage (1074).

4.3 Estimating Translation Parameters

Figure 17:
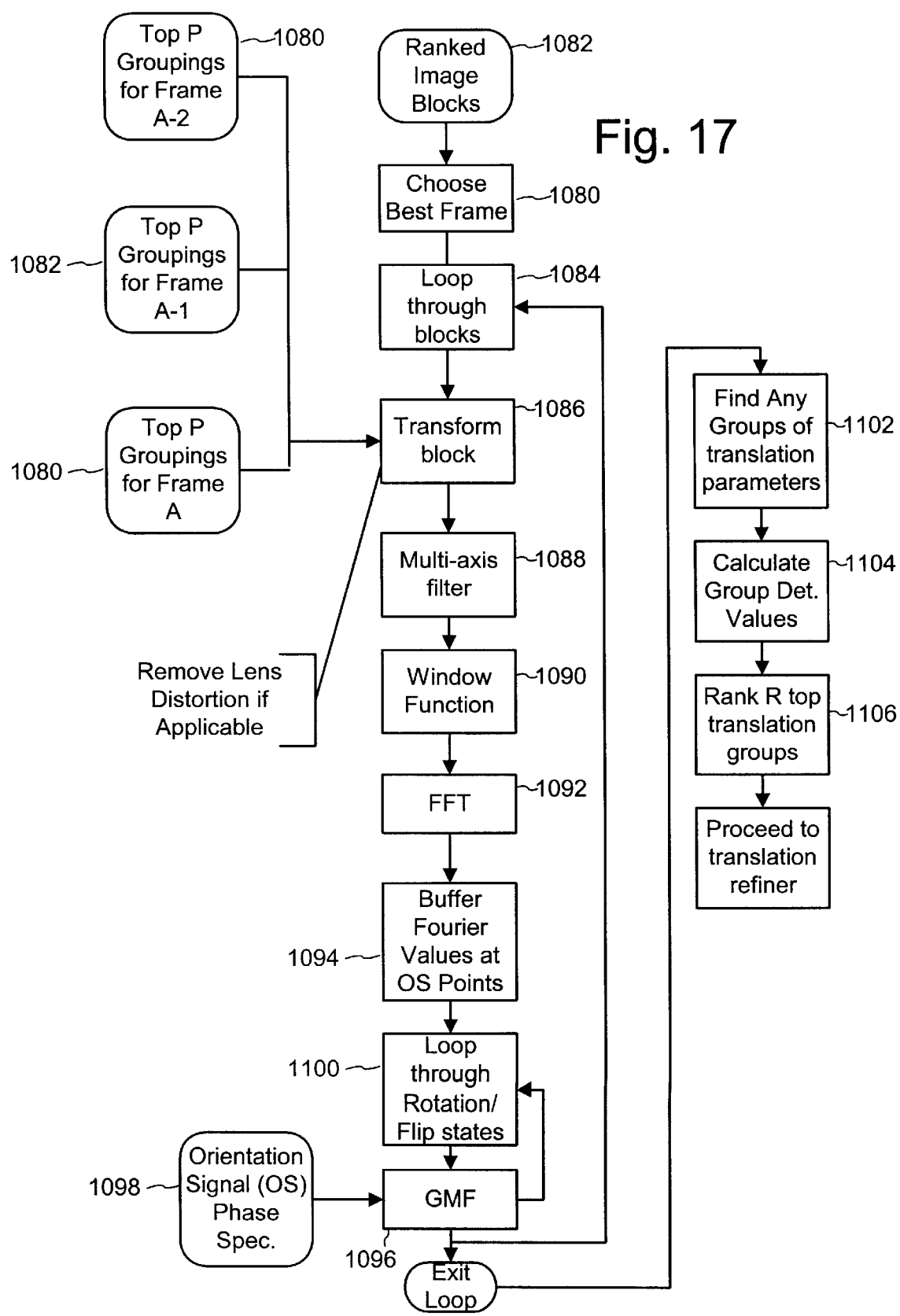
FIG. 17 is a diagram illustrating a process for estimating translation parameters of the detection watermark signal.

FIG. 17 is a flow diagram illustrating a method for estimating translation parameters of the orientation signal, using information gathered from the previous stages.

In this stage, the detector estimates translation parameters. These parameters indicate the starting point of a watermarked block in the spatial domain. The translation parameters, along with rotation, scale and differential scale, form a complete 6D orientation vector. The 6D vector enables the reader to extract luminance sample data in approximately the same orientation as in the original watermarked image.

One approach is to use generalized match filtering to find the translation parameters that provide the best correlation. Another approach is to continue to collect evidence about the orientation vector candidates, and provide a more comprehensive ranking of the orientation vectors based on all of the evidence gathered thus far. The following paragraphs describe an example of this type of an approach.

To extract translation parameters, the detector proceeds as follows. In the multi-frame case, the detector selects the frame that produced 4D orientation vectors with the highest detection values (1080). It then processes the blocks 1082 in that frame in the order of their detection value. For each block (1084), it applies the 4D vector to the luminance data to generate rectified block data (1086). The detector then performs dual axis filtering (1088) and the window function (1090) on the data. Next, it performs an FFT (1092) on the image data to generate an array of Fourier data. To make correlation operations more efficient, the detector buffers the fourier values at the orientation points (1094).

The detector applies a generalized match filter 1096 to correlate a phase specification of the orientation signal (1098) with the transformed block data. The result of this process is a 2D array of correlation values. The peaks in this array represent the translation parameters with the highest correlation. The detector selects the top peaks and then applies a median filter to determine the center of each of these peaks. The center of the peak has a corresponding correlation value and sub-pixel translation value. This process is one example of getting translation parameters by correlating the Fourier phase specification of the orientation signal and the image data. Other methods of phase locking the image data with a synchronization signal like the orientation signal may also be employed.

Depending on the implementation, the detector may have to resolve additional ambiguities, such as rotation angle and flip ambiguity. The degree of ambiguity in the rotation angle depends on the nature of the orientation signal. If the orientation signal is octally symmetric (symmetric about horizontal, vertical and diagonal axes in the spatial frequency domain), then the detector has to check each quadrant (0–90, 90–180, 180–270, and 270–360 degrees) to find out which one the rotation angle resides in. Similarly, if the orientation signal is quad symmetric, then the detector has to check two cases, 0–180 and 180–270.

The flip ambiguity may exist in some applications where the watermarked image can be flipped. To check for rotation and flip ambiguities, the detector loops through each possible case, and performs the correlation operation for each one (1100).

At the conclusion of the correlation process, the detector has produced a set of the top translation parameters with associated correlation values for each block. To gather additional evidence, the detector groups similar translation parameters from different blocks (1102), calculates a group detection value for each set of translation parameters 1104, and then ranks the top translation groups based on their corresponding group detection values 1106.

4.4 Refining Translation Parameters

Figure 18:
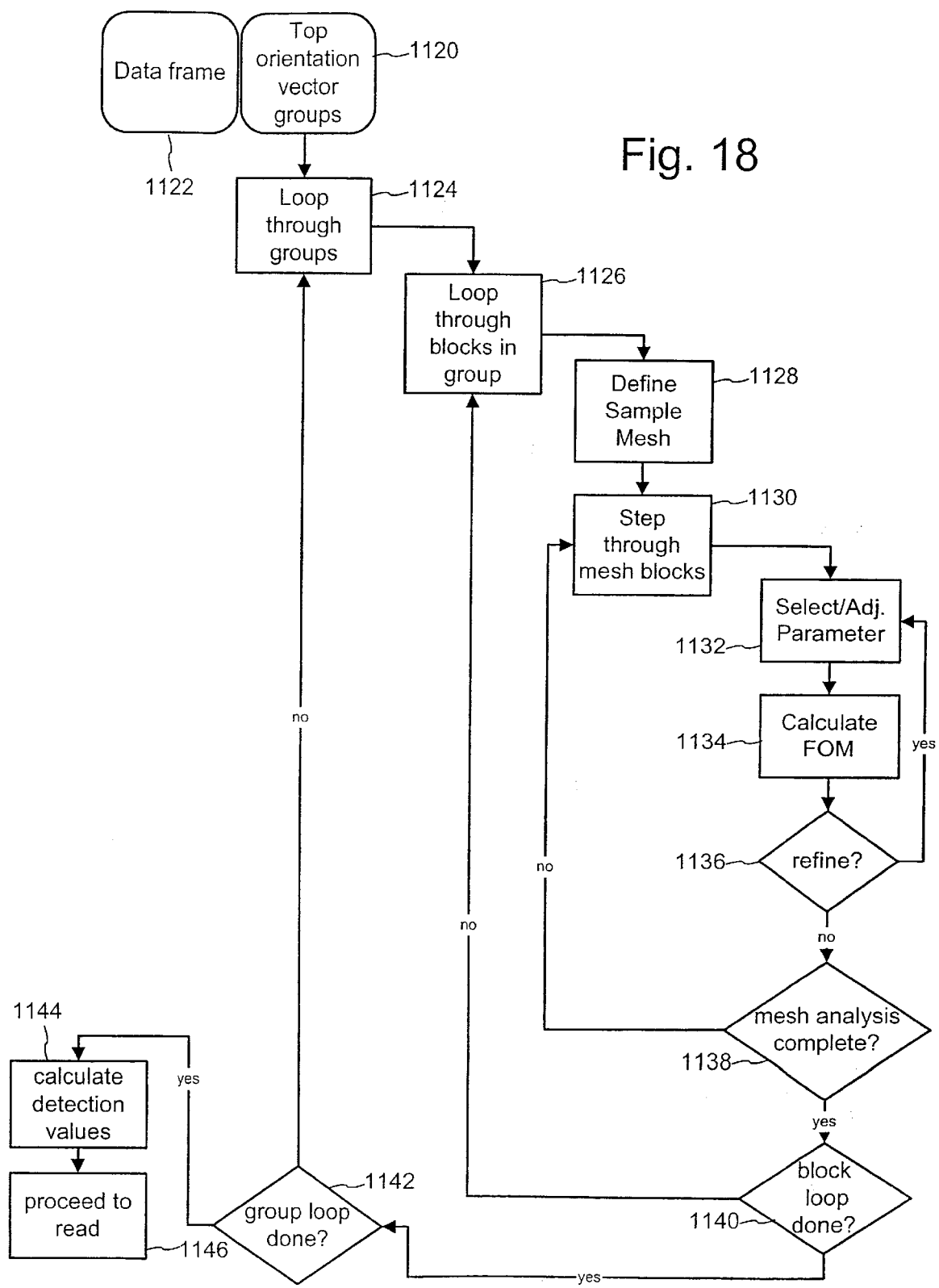
FIG. 18 is a diagram illustrating a process for refining orientation parameters using known message bits in the watermark message.

Having gathered translation parameter estimates, the detector proceeds to refine these estimates. FIG. 18 is a flow diagram illustrating a process for refining orientation parameters. At this stage, the detector process has gathered a set of the top translation parameter candidates 1120 for a given frame 1122. The translation parameters provide an estimate of a reference point that locates the watermark, including both the orientation and message components, in the image frame. In the implementation depicted here, the translation parameters are represented as horizontal and vertical offsets from a reference point in the image block from which they were computed.

Recall that the detector has grouped translation parameters from different blocks based on their geometric proximity to each other. Each pair of translation parameters in a group is associated with a block and a 4D vector (rotation, scale, and 2 differential scale parameters). As shown in FIG. 18, the detector can now proceed to loop through each group (1124), and through the blocks within each group (1126), to refine the orientation parameters associated with each member of the groups. Alternatively, a simpler version of the detector may evaluate only the group with the highest detection value, or only selected blocks within that group.

Regardless of the number of candidates to be evaluated, the process of refining a given orientation vector candidate may be implemented in a similar fashion. In the refining process, the detector uses a candidate orientation vector to define a mesh of sample blocks for further analysis (1128). In one implementation, for example, the detector forms a mesh of 32 by 32 sample blocks centered around a seed block whose upper right corner is located at the vertical and horizontal offset specified by the candidate translation parameters. The detector reads samples from each block using the orientation vector to extract luminance samples that approximate the original orientation of the host image at encoding time.

The detector steps through each block of samples (1130). For each block, it sets the orientation vector (1132), and then uses the orientation vector to check the validity of the watermark signal in the sample block. It assesses the validity of the watermark signal by calculating a figure of merit for the block (1134). To further refine the orientation parameters associated with each sample block, the detector adjusts selected parameters (e.g., vertical and horizontal translation) and re-calculates the figure of merit. As depicted in the inner loop in FIG. 18 (block 1136 to 1132), the detector repeatedly adjusts the orientation vector and calculates the figure of merit in an attempt to find a refined orientation that yields a higher figure of merit.

The loop (1136) may be implemented by stepping through a predetermined sequence of adjustments to parameters of the orientation vectors (e.g., adding or subtracting small increments from the horizontal and vertical translation parameters). In this approach, the detector exits the loop after stepping through the sequence of adjustments. Upon exiting, the detector retains the orientation vector with the highest figure of merit.

There are a number of ways to calculate this figure of merit. One figure of merit is the degree of correlation between a known watermark signal attribute and a corresponding attribute in the signal suspected of having a watermark. Another figure of merit is the strength of the watermark signal (or one of its components) in the suspect signal. For example, a figure of merit may be based on a measure of the watermark message signal strength and/or orientation pattern signal strength in the signal, or in a part of the signal from which the detector extracts the orientation parameters. The detector may computes a figure of merit based the strength of the watermark signal in a sample block. It may also compute a figure of merit based on the percentage agreement between the known bits of the message and the message bits extracted from the sample block.

When the figure of merit is computed based on a portion of the suspect signal, the detector and reader can use the figure of merit to assess the accuracy of the watermark signal detected and read from that portion of the signal. This approach enables the detector to assess the merits of orientation parameters and to rank them based on their figure of merit. In addition, the reader can weight estimates of watermark message values based on the figure of merit to recover a message more reliably.

The process of calculating a figure of merit depends on attributes the watermark signal and how the embedder inserted it into the host signal. Consider an example where the watermark signal is added to the host signal. To calculate a figure of merit based on the strength of the orientation signal, the detector checks the value of each sample relative to its neighbors, and compares the result with the corresponding sample in a spatial domain version of the orientation signal. When a sample's value is greater than its neighbors, then one would expect that the corresponding orientation signal sample to be positive. Conversely, when the sample's value is less than its neighbors, then one would expect that the corresponding orientation sample to be negative. By comparing a sample's polarity relative to its neighbors with the corresponding orientation sample's polarity, the detector can assess the strength of the orientation signal in the sample block. In one implementation, the detector makes this polarity comparison twice for each sample in an N by N block (e.g., N=32, 64, etc): once comparing each sample with its horizontally adjacent neighbors and then again comparing each sample with its vertically adjacent neighbors. The detector performs this analysis on samples in the mesh block after re-orienting the data to approximate the original orientation of the host image at encoding time. The result of this process is a number reflecting the portion of the total polarity comparisons that yield a match.

To calculate a figure of merit based on known signature bits in a message, the detector invokes the reader on the sample block, and provides the orientation vector to enable the reader to extract coded message bits from the sample block. The detector compares the extracted message bits with the known bits to determine the extent to which they match. The result of this process is a percentage agreement number reflecting the portion of the extracted message bits that match the known bits. Together the test for the orientation signal and the message signal provide a figure of merit for the block.

As depicted in the loop from blocks 1138 to 1130, the detector may repeat the process of refining the orientation vector for each sample block around the seed block. In this case, the detector exits the loop (1138) after analyzing each of the sample blocks in the mesh defined previously (1128). In addition, the detector may repeat the analysis in the loop through all blocks in a given group (1140), and in the loop through each group (1142).

After completing the analysis of the orientation vector candidates, the detector proceeds to compute a combined detection value for the various candidates by compiling the results of the figure of merit calculations. It then proceeds to invoke the reader on the orientation vector candidates in the order of their detection values.

4.5 Reading the Watermark

Figure 19:
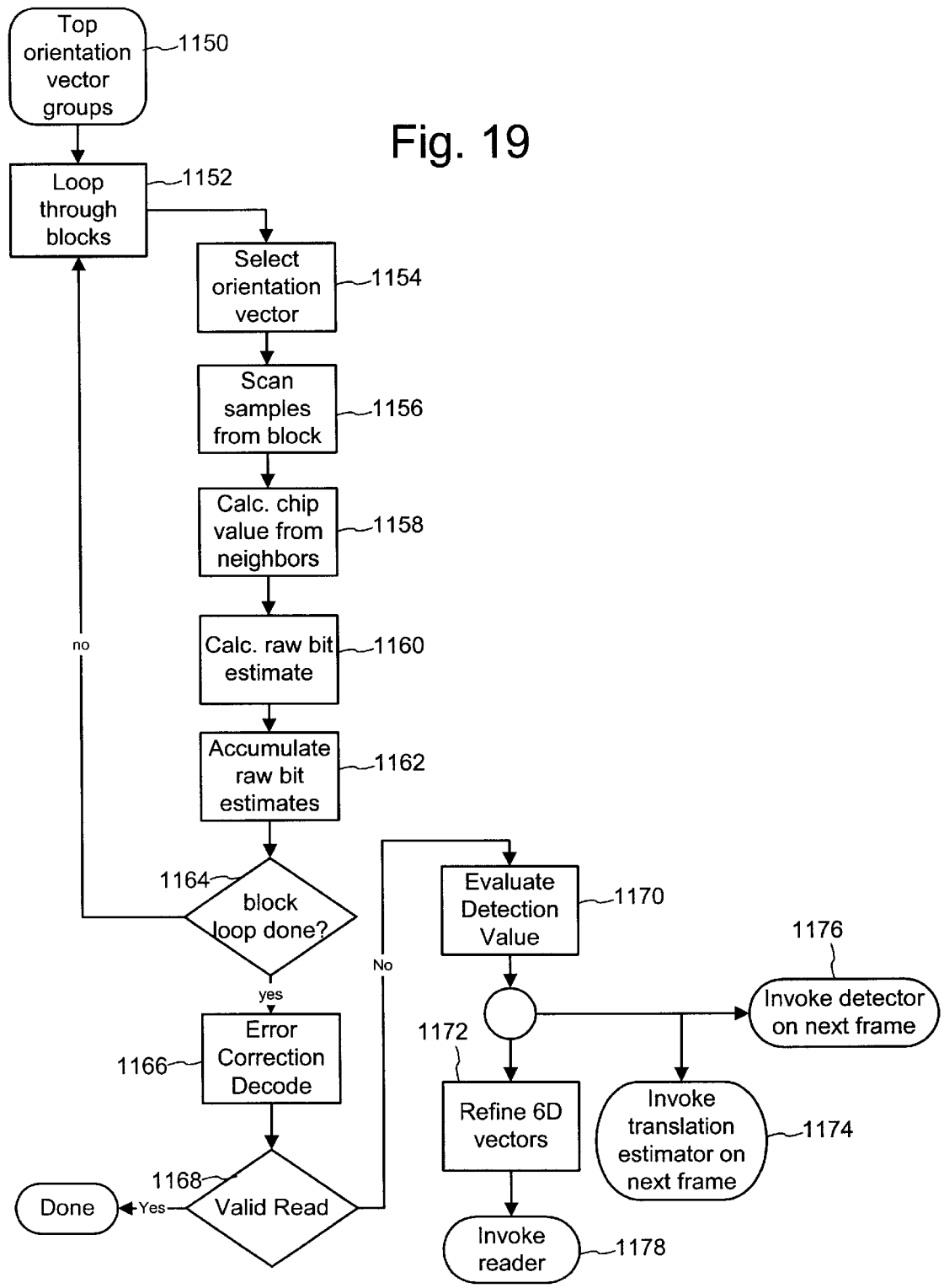
FIG. 19 is a diagram illustrating a process for reading a watermark message from an image, after re-orienting the image data using an orientation vector.

FIG. 19 is a flow diagram illustrating a process for reading the watermark message. Given an orientation vector and the corresponding image data, the reader extracts the raw bits of a message from the image. The reader may accumulate evidence of the raw bit values from several different blocks. For example, in the process depicted in FIG. 19, the reader uses refined orientation vectors for each block, and accumulates evidence of the raw bit values extracted from the blocks associated with the refined orientation vectors.

The reading process begins with a set of promising orientation vector candidates 1150 gathered from the detector. In each group of orientation vector candidates, there is a set of orientation vectors, each corresponding to a block in a given frame. The detector invokes the reader for one or more orientation vector groups whose detection values exceed a predetermined threshold. For each such group, the detector loops over the blocks in the group (1152), and invokes the reader to extract evidence of the raw message bit values.

Recall that previous stages in the detector have refined orientation vectors to be used for the blocks of a group. When it invokes the reader, the detector provides the orientation vector as well as the image block data (1154). The reader scans samples starting from a location in a block specified by the translation parameters and using the other orientation parameters to approximate the original orientation of the image data (1156).

As described above, the embedder maps chips of the raw message bits to each of the luminance samples in the original host image. Each sample, therefore, may provide an estimate of a chip's value. The reader reconstructs the value of the chip by first predicting the watermark signal in the sample from the value of the sample relative to its neighbors as described above (1158). If the deduced value appears valid, then the reader extracts the chip's value using the known value of the pseudo-random carrier signal for that sample and performing the inverse of the modulation function originally used to compute the watermark information signal (1160). In particular, the reader performs an exclusive OR operation on the deduced value and the known carrier signal bit to get an estimate of the raw bit value. This estimate serves as an estimate for the raw bit value. The reader accumulates these estimates for each raw bit value (1162).

As noted above, the reader computes an estimate of the watermark signal by predicting the original, un-watermarked signal and deriving an estimate of the watermark signal based on the predicted signal and the watermarked signal. It then computes an estimate of a raw bit value based on the value of the carrier signal, the assignment map that maps a raw bit to the host image, and the relationship among the carrier signal value, the raw bit value, and the watermark signal value. In short, the reader reverses the embedding functions that modulate the message with the carrier and apply the modulated carrier to the host signal. Using the predicted value of the original signal and an estimate of the watermark signal, the reader reverses the embedding functions to estimate a value of the raw bit.

The reader loops over the candidate orientation vectors and associated blocks, accumulating estimates for each raw bit value (1164). When the loop is complete, the reader calculates a final estimate value for each raw bit from the estimates compiled for it. It then performs the inverse of the error correction coding operation on the final raw bit values (1166). Next, it performs a CRC to determine whether the read is valid. If no errors are detected, the read operation is complete and the reader returns the message (1168).

However, if the read is invalid, then the detector may either attempt to refine the orientation vector data further, or start the detection process with a new frame. Preferably, the detector should proceed to refine the orientation vector data when the combined detection value of the top candidates indicates that the current data is likely to contain a strong watermark signal. In the process depicted in FIG. 19, for example, the detector selects a processing path based on the combined detection value (1170). The combined detection value may be calculated in a variety of ways. One approach is to compute a combined detection value based on the geometric coincidence of the top orientation vector candidates and a compilation of their figures of merit. The figure of merit may be computed as detailed earlier.

For cases where the read is invalid, the processing paths for the process depicted in FIG. 19 include: 1) refine the top orientation vectors in the spatial domain (1172); 2) invoke the translation estimator on the frame with the next best orientation vector candidates (1174); and 3) re-start the detection process on a new frame (assuming an implementation where more than one frame is available)(1176). These paths are ranked in order from the highest detection value to the lowest. In the first case, the orientation vectors are the most promising. Thus, the detector re-invokes the reader on the same candidates after refining them in the spatial domain (1178). In the second case, the orientation vectors are less promising, yet the detection value indicates that it is still worthwhile to return to the translation estimation stage and continue from that point. Finally, in the final case, the detection value indicates that the watermark signal is not strong enough to warrant further refinement. In this case, the detector starts over with the next new frame of image data.

In each of the above cases, the detector continues to process the image data until it either makes a valid read, or has failed to make a valid read after repeated passes through the available image data.

5.0 Operating Environment for Computer Implementations

Figure 20:
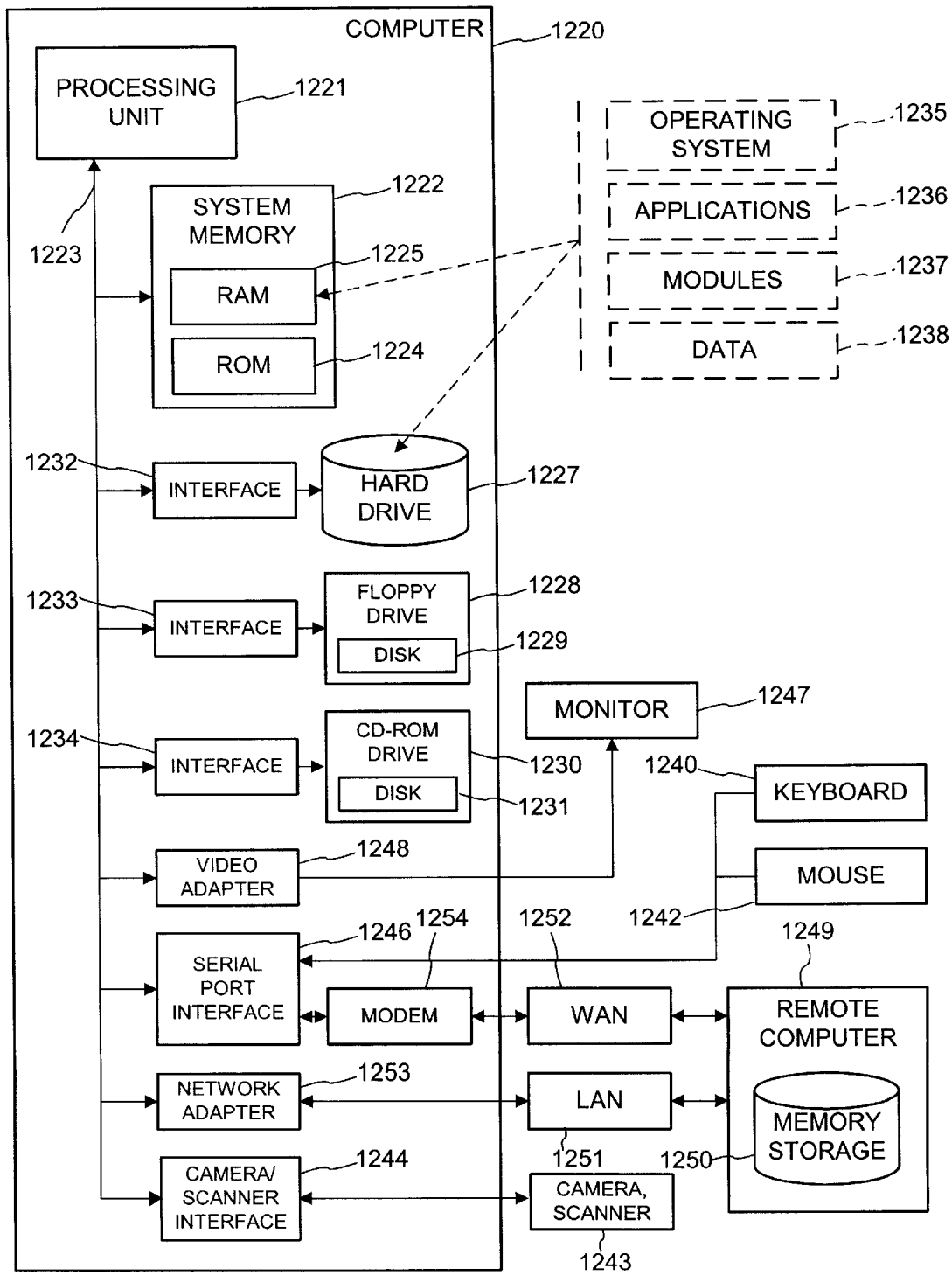
FIG. 20 is a diagram of a computer system that serves as an operating environment for software implementations of a watermark embedder, detector and reader.

FIG. 20 illustrates an example of a computer system that serves as an operating environment for software implementations of the watermarking systems described above. The embedder and detector implementations are implemented in C/C++ and are portable to many different computer systems. FIG. 20 generally depicts one such system.

The computer system shown in FIG. 20 includes a computer 1220, including a processing unit 1221, a system memory 1222, and a system bus 1223 that interconnects various system components including the system memory to the processing unit 1221.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 1224 and random access memory (RAM) 1225. A basic input/output system 1226 (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading a CD-ROM or DVD disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions (program code such as dynamic link libraries, and executable files), etc. for the computer 1220.

Although the description of computer-readable media above refers to a hard disk, a removable magnetic disk and an optical disk, it can also include other types of media that are readable by a computer, such as magnetic cassettes, flash memory cards, digital video disks, and the like.

A number of program modules may be stored in the drives and RAM 1225, including an operating system 1235, one or more application programs 1236, other program modules 1237, and program data 1238.

A user may enter commands and information into the computer 1220 through a keyboard 1240 and pointing device, such as a mouse 1242. Other input devices may include a microphone, joystick, game pad, satellite dish, digital camera, scanner, or the like. A digital camera or scanner 43 may be used to capture the target image for the detection process described above. The camera and scanner are each connected to the computer via a standard interface 44. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

Other input devices may be connected to the processing unit 1221 through a serial port interface 1246 or other port interfaces (e.g., a parallel port, game port or a universal serial bus (USB)) that are coupled to the system bus.

A monitor 1247 or other type of display device is also connected to the system bus 1223 via an interface, such as a video adapter 1248. In addition to the monitor, computers typically include other peripheral output devices (not shown), such as speakers and printers.

The computer 1220 operates in a networked environment using logical connections to one or more remote computers, such as a remote computer 1249. The remote computer 1249 may be a server, a router, a peer device or other common network node, and typically includes many or all of the elements described relative to the computer 1220, although only a memory storage device 1250 has been illustrated in FIG. 20. The logical connections depicted in FIG. 20 include a local area network (LAN) 1251 and a wide area network (WAN) 1252. Such networking environments are commonplace in offices, enterprise-wide computer networks, intranets and the Internet.

When used in a LAN networking environment the computer 1220 is connected to the local network 1251 through a network interface or adapter 1253. When used in a WAN networking environment, the computer 1220 typically includes a modem 1254 or other means for establishing communications over the wide area network 1252, such as the Internet. The modem 1254, which may be internal or external, is connected to the system bus 1223 via the serial port interface 1246.

In a networked environment, program modules depicted relative to the computer 1220, or portions of them, may be stored in the remote memory storage device. The processes detailed above can be implemented in a distributed fashion, and as parallel processes. It will be appreciated that the network connections shown are exemplary and that other means of establishing a communications link between the computers may be used.

While the computer architecture depicted in FIG. 20 is similar to typical personal computer architectures, aspects of the invention may be implemented in other computer architectures, such as hand-held computing devices like Personal Digital Assistants, audio and/video players, network appliances, telephones, etc.

Watermark in the Approximate Band of a Wavelet Decomposition

This section describes a method of encoding a watermark in the lowest frequency subband of a wavelet decomposition of a host signal. This approach may be used to encode a watermark orientation signal or other types of watermarks. One example is a watermarking method where the watermark signal is defined as a collection of impulse functions in the Fourier magnitude domain with pseudorandom phase.

This method performs a wavelet decomposition of a host signal and embeds a watermark in the lowest frequency subband. The encoding process can be summarized as follows:

1. Perform wavelet domain transform to decompose media signal into low frequency subband (the approximate band) and one or more higher frequency subbands;
2. Modify low frequency subband to encode auxiliary information, such as the orientation watermark signal.
3. Perform inverse of wavelet domain transform to construct a composite media signal.

Stages 2 and 3 may be repeated to adjust the extent of the modification to the low frequency subband to minimize perceptibility.

The decoding process can be summarized as:
1. Perform wavelet decomposition;
2. Execute detection functions in the low frequency subband to extract auxiliary information.

To illustrate this process, consider the image watermark methods detailed above. The orientation watermark signal may be encoded into the low frequency subband of the wavelet decomposition of a host image. The encoding process is similar to the process described previously. It includes a wavelet decomposition as a pre-processing step to compute the low frequency subband and a corresponding inverse wavelet transform as a post processing step to transform the watermarked signal to its original domain.

The decoding process is also similar, except that the wavelet decomposition is a pre-processing step. The detector performs detection of the orientation signal on the low frequency subband, after this preprocessing step.

Other Wavelet Domain Watermark Methods

The following sections describe additional wavelet domain watermarking methods. These wavelet-based techniques may be used to implement new wavelet based watermark encoding and decoding methods or to enhance existing watermark encoding and decoding methods. As such, the following sections describe wavelet-based watermark encoding and decoding methods as well as wavelet based signal processing methods that may be used to enhance other types of watermark methods.

Wavelet-Based Watermark Embedding

Figure 21:
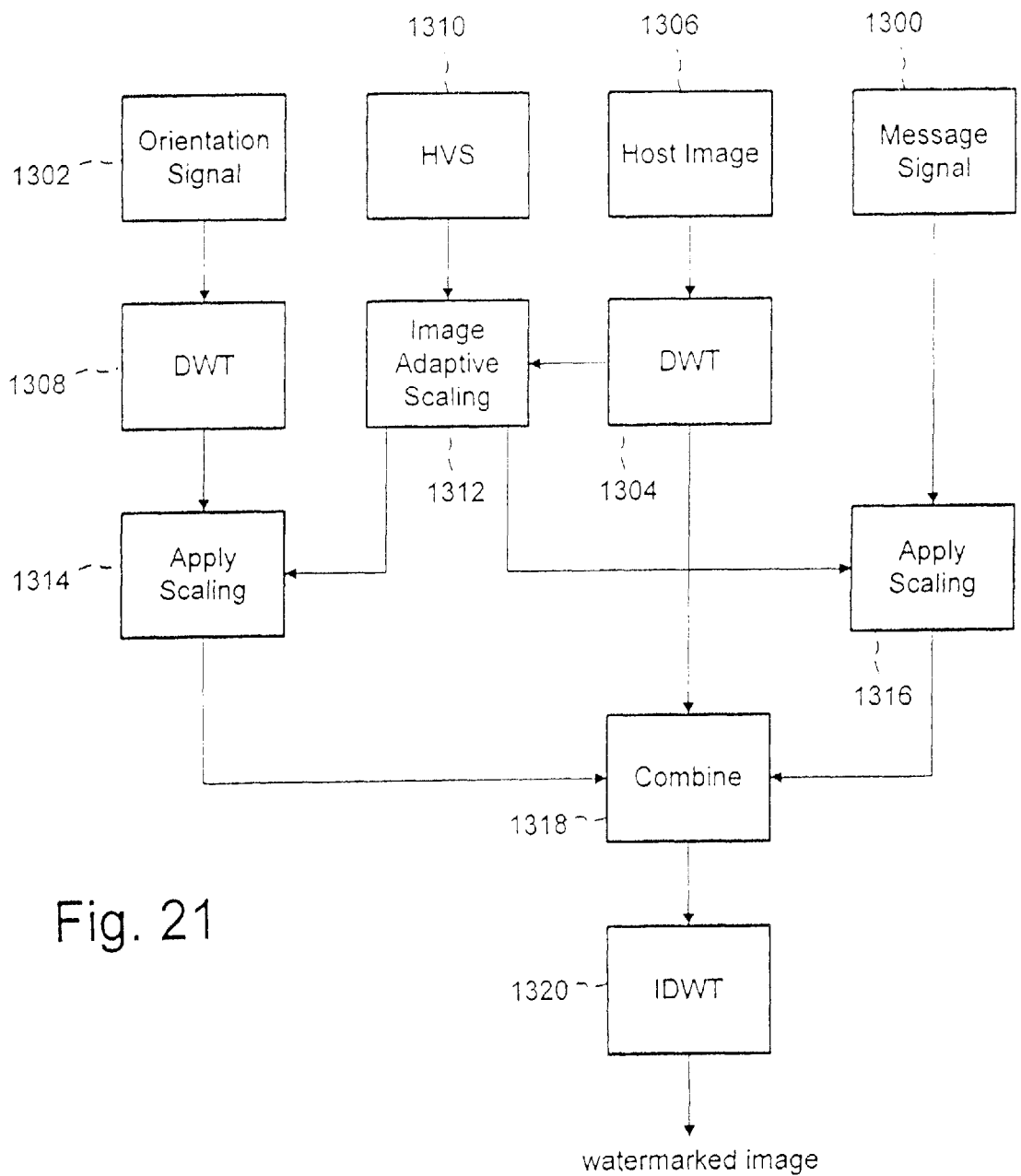
FIG. 21 is a block diagram of a wavelet based watermark embedding process.

FIG. 21 is a block diagram of a wavelet based watermark embedding process. In this process, the watermark to be embedded includes a message signal component 1300 and an orientation signal component 1302. Both are encoded so as to be imperceptible in a watermarked image. The orientation signal component is used to detect the watermark and to compute its orientation in a signal suspected of containing a watermark. The message signal component carries a message of one or more symbols. Each symbol may be binary, M-ary, etc.

To embed the message in the host signal, the embedder transforms a message into the message signal and embeds this signal component into the host image. There are many different ways to compute a message signal and embed it into the host image. One way is to spread each bit of a binary message over a pseudorandom number using an exclusive OR or multiplication operation between each bit value of the message and a corresponding pseudorandom number. A message symbol value of binary 1 may be represented as a 1 and binary 0 as a −1. This spreading process creates a message signal comprising an array of positive and negative values. Each of the resulting message signal samples may be mapped to one or more wavelet coefficients, and then embedded by adjusting the coefficients according to a predetermined embedding function. For each message signal sample, evaluation of the embedding function (or its inverse) for a corresponding marked coefficient or coefficients produces a value that corresponds to the desired sample value.

As shown in FIG. 21, the Discrete Wavelet Transform (DWT) process 1304 transforms an image 1306 to be embedded to a wavelet transform domain. Unless already defined in the wavelet transform domain, the orientation signal is transformed (1308) into the wavelet domain to prepare it for encoding in that domain.

In some implementations, the message and orientation signal are integrated into a single watermark signal. Some attributes of the watermark signal may be used to detect the watermark and determine its orientation, while others may be used to convey one or more symbols (e.g., binary bits or M-ary symbols) of a message. One example of an attribute used to detect the watermark is a pattern of impulse functions in the Fourier magnitude domain, where the impulse functions have pseudorandom phase. One example of an attribute used to convey a symbol is the magnitude of the watermark signal, its polarity, or a value computed as a function of the watermarked signal. For example, the presence or absence of a signal sample at the position of one of these impulse functions may correspond to a binary zero or one message symbol. Alternatively, the magnitude or polarity (1 corresponds to a binary 1 and −1 corresponds to a binary 0) of the watermark sample or set of samples may correspond to binary one or zero message symbol.

To control perceptibility of the watermark, the encoder uses a human visual system (HVS) model 1310 to analyze the host image and determine how to control encoding of the watermark to reduce perceptibility of the watermark. As shown in FIG. 21, an image adaptive modeling process uses criteria established in the HVS model and applies this criteria to the wavelet transform of the image to determine its perceptual masking capability. The output of the modeling process provides a control signal 1312 that adapts the watermark to the host image based on the computed perceptual masking capability. The control signal may be implemented as a gain vector with elements that adjust the strength of corresponding elements of the watermark signal to adapt it to the host image. Different gain vectors may be applied to the orientation and message signal components (1314, 1316).

The encoding module combines the watermark signal, including message and orientation signal components (if applicable), to the wavelet domain transform of the host image 1318. The function used to combine the signals may be linear, such as a simple adding of corresponding elements of each signal. Alternatively, the function may be non-linear, such as adjusting a wavelet coefficient or set of coefficients so that a function of those coefficients conform to a value representing a message symbol value being embedded. The encoder then applies an inverse wavelet transform 1320 to the combined signal to create a watermarked image.

Wavelet Based Watermark Detection

Figure 22:
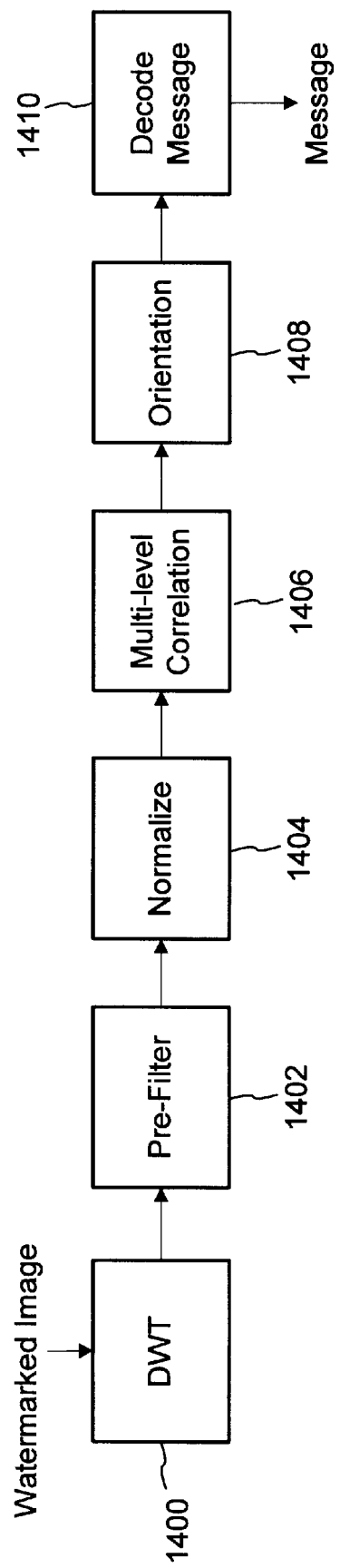
FIG. 22 is a block diagram of a watermark decoding process for a wavelet domain watermark.

FIG. 22 is a block diagram of a watermark decoding process for a wavelet domain watermark. The input to this process is an image suspected of containing a watermark (suspect image). Initially, the watermark decoder screens the suspect image to determine whether a watermark is present, and to compute the orientation of the watermark in the suspect signal. First, the decoder performs a wavelet domain transform (DWT) on the suspect image 1400.

As part of the screening process, the decoder optionally performs a pre-filtering operation 1402 on the image. The purpose of the pre-filtering operation is to enhance watermark detection by removing parts of the host signal that are not likely to contain the watermark signal. As such, the pre-filtering operation filters out parts of the image signal that are not likely to contain the watermark orientation signal.

The DWT of the image may contribute to the pre-filtering process by helping to isolate the watermark signal. In particular, if the watermark orientation signal is known to be embedded in selected bands, or at least embedded more strongly in selected bands, then the watermark detector selects those bands and performs detection operations on them.

After applying the DWT, a filter may be applied to remove subband samples below a threshold. The threshold is derived from the signal itself by estimating it from subband samples of a predetermined low resolution cutoff.

Another operation that can improve detection in some implementations is to add blocks of subband samples together to increase the signal to noise ratio of the watermark signal. This block addition process increases signal to noise ratio in implementations where the watermark signal is repeated in wavelet coefficients throughout the image. For example, if the orientation signal is repeated throughout the image, the signal to noise ratio of the watermark orientation signal may be enhanced by summing groups of wavelet coefficients. By adding blocks of subband samples together, the strength of the common watermark signal in the summed blocks increases.

The watermark decoder optionally performs a normalization of the subband samples. The normalization may be implemented as part of the pre-filtering process or as a separate process. Normalization is used to make subsequent detection operation less sensitive to noise. Examples of normalization processes include zero mean unity variance normalization or dividing each sample by a local average (e.g., an average of samples in a 3 by 3, 5 by 5, etc. neighborhood around each subband sample).

The watermark then performs a multi-level correlation to detect a watermark and determine its orientation. Multi-level correlation refers to a correlation process that correlates a reference signal with the suspect signal at two or more levels of a wavelet decomposition. An example of this type of correlation is detailed further below. The multi-level correlation process computes an initial estimate of a watermark's orientation at an initial low level of resolution of the wavelet decomposition. It then refines the orientation at higher levels of resolution. In a two dimensional signal like an image, the orientation may be represented as one or more orientation parameters, such as the rotational angle, scale, translation (e.g., origin coordinates), differential scale, shear, affine transform coefficients, etc.

As detailed further below, the multi-level correlation process may be used alone or combination with other detection operations to calculate orientation parameters. Certain types of wavelet transforms are not translation invariant. A translation invariant wavelet transform (e.g., redundant DWT) may be used to compute translation parameters on wavelet domain samples. Alternatively, the detector may transform the watermarked signal into other domains that are translation invariant and compute translation in that domain.

The correlation process screens suspect signals that are unlikely to contain a watermark signal. One way to screen the suspect signal is to set thresholds for the amount of correlation measured at each level of resolution. If the measurement of correlation exceeds a threshold, the decoding process continues to refine the orientation parameters (e.g., rotation, scale, translation, etc.) of the watermark. Otherwise, it indicates that the suspect signal does not contain a recoverable watermark.

Having successfully computed the orientation of the watermark signal, the decoder proceeds to decode a message from the watermark. The decoder uses the orientation parameters to orient the image data for message reading operations. The details of the message reading process vary from one implementation to another. In some implementations, the decoder may extract a message from a residual signal after predicting and removing a predicted version of the original un-watermarked signal. Alternatively, the decoder may perform a message decoding by evaluating the embedding function (or its inverse) directly on the re-oriented image data. In implementations where the orientation signal carries a message, the decoder decodes the message from the orientation signal.

Types of Wavelet Transforms

Wavelet transforms have a number of attributes that make them useful for watermark applications. This section describes some of these attributes and suggests how one might select a type of wavelet domain transform for watermark applications.

The wavelet transform provides spatial and frequency localization. In other words, spatial information about the original signal is maintained in the coefficients of the wavelet decomposition. Another attribute of the wavelet transform is that feature extraction can be performed in the wavelet transform domain. For example, edges can be detected and quantified in the wavelet domain. Another attribute is that energy is typically compacted in low frequency subbands.

There are many types of wavelet transforms. Some examples include Haar, Daubechier, Symlet, Morlet, Mexican Hat, and Meyer. The type selected for a watermarking application depends on the particular needs of that application. There are a number of criteria for selection the wavelet transform used in a watermark encoding and decoding application. These include: regularity, symmetry, orthogonality, size of support, speed, and reconstruction.

Regularity is a mathematical property of a transform that refers to its differentiability. If the transform is easily differentiable, meaning that it has few discontinuities, then it has good regularity. Regularity allows for smooth reconstruction of a wavelet decomposed signal.

Symmetry is a property that relates to the extent to which the transform introduces phase error. A symmetric filter is also referred to as having linear phase. Such a filter introduces no phase error.

Orthogonality and biorthogonality are properties of a transform that enable fast decomposition and more accurate reconstruction.

A redundant wavelet transform, as noted above, is translation or "shift" invariant. Redundant wavelet transforms, therefore, are useful in watermark applications where the detector computes translation parameters in the wavelet domain.

The directional wavelet transform retains directional information, and as such is useful in detectors that compute orientation parameters in the wavelet domain.

The size of the support refers to the number of coefficients in the filter. The coefficients are also referred to as the filter taps. A more compact filter (e.g., fewer taps) is preferred, but not required.

Encoding a Watermark in the Wavelet Domain

Previous sections described approaches for watermark encoding in the wavelet domain. This section discusses additional aspects of encoding in the wavelet domain.

Band Selection

Band selection refers a process of selecting which subband or subbands to encode and decode a watermark signal. Bands should be selected so as to reduce perceptibility of the watermark, while making the watermark robust to expected forms of manipulation, such as compression, digital to analog and analog to digital conversion, geometric transformation, etc.

The bands may be selected adaptively in a watermark embedder and detector. For example, the embedder may analyze bands to identify those that have better masking properties and embed the watermark, or components of it, in those bands. Similarly, the detector can perform a similar analysis to isolate bands for detection operations.

Another aspect of selecting bands for watermarking is determining where to embed, detect and decode different components of the watermark. For example, a watermark orientation signal may be located in a different band from a watermark message signal to minimize interference between the two watermark signal components.

Figure 23:
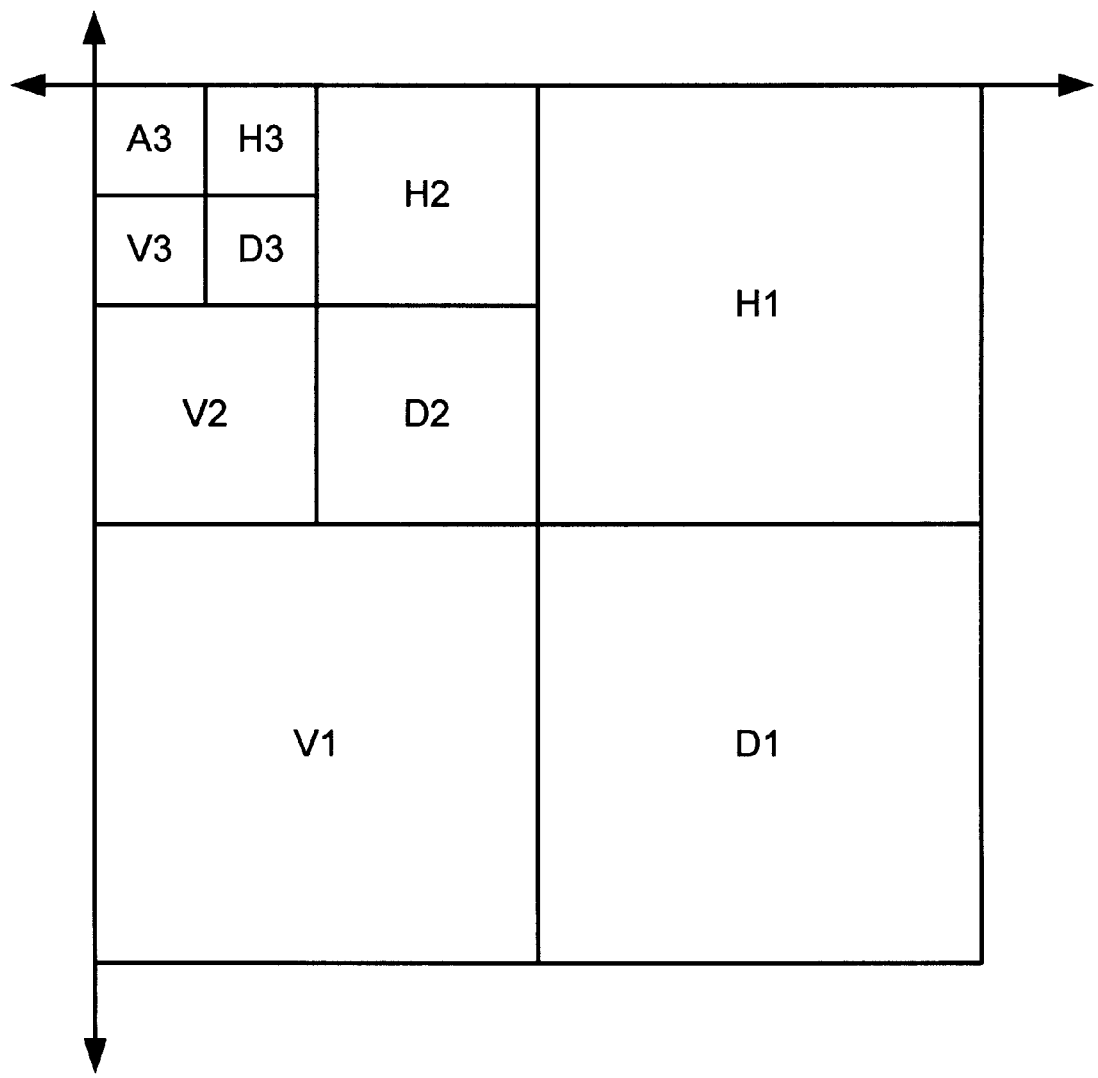
FIG. 23 is a diagram depicting a wavelet decomposition.

FIG. 23 shows a diagram of one possible wavelet decomposition of an image. The image is hierarchically decomposed into four levels: an approximate A3 (the lowest level of the decomposition), and three additional levels, each having a vertical (V), horizontal (H) and diagonal (D) band. The size of each block depicts the resolution of the corresponding band: the smaller the block, the lower the resolution of that block.

Preferably, watermarks should be inserted in bands that have a greater potential for masking the watermark and that will survive common signal processing operations. Bands with greater average energy and energy compaction are good candidates for watermark embedding.

In implementations where there are separate orientation and message signal components of the watermark, the orientation and message signal components can be made orthogonal by embedding them in different bands. Such orthogonal embedding of the watermark components avoids them from interfering with each other in decoding operations.

Coefficient Selection

The watermark signal should be encoded in coefficients of a selected band or bands that have good masking properties and that make the watermark more robust to manipulation. These coefficients tend to be in the mid to lower levels of the wavelet decomposition.

Adjusting Coefficient Values

As noted previously, a watermark signal may be encoded using an embedding function that adjusts one or more coefficients to encode a watermark signal sample. The embedding function may add a watermark signal sample to a corresponding coefficient or set of coefficients in one or more bands. Other embedding functions may be used as well. For example, message symbols or corresponding watermark signal sample values may correspond to quantization functions. The quantization function corresponding to a particular symbol is applied to the coefficient or coefficients that correspond to that symbol. Message symbols or corresponding watermark signal sample values may also be encoded by adjusting two or more coefficients so that a function applied to those adjusted coefficients produces a value corresponding to the desired symbol or watermark signal value.

Message Spreading

As noted previously, a watermark message may be spread over a wideband carrier signal. One example is spreading each bit of a binary message over pseudorandom number. The resulting sample values of the watermark message signal are mapped to wavelet coefficients or sets of coefficients. The encoder then applies an embedding function to embed the watermark message samples into corresponding wavelet coefficients.

Perceptibility Modeling

The watermark encoder shown in FIG. 21 employs image adaptive perceptual modeling. This section describe various methods to implement this modeling. The human visual system model shown in FIG. 21 represents a model of a human's visual sensitivity to changes in an image. There may be several components of this model, such as:

1. Sensitivity to changes at different frequencies; and
2. Sensitivity to textures or highly busy or active image areas.
3. Sensitivity to local contrast;
4. Sensitivity to changes in different colors;
5. Sensitivity to edges, including directional edges.

For each of these components or some combination of them, the human visual model specifies how to adapt the watermark signal to the image. The perceptual analyzer in the encoder computes attributes of the image and applies a HVS model to these attributes to compute control data, such as a scale vector, that adapts the watermark signal to the host image. Attributes of the host image that impact the perceptual analysis may be evaluated in the wavelet domain or in some other domain.

The wavelet domain transform decomposes the host signal into subbands at different frequencies. As such, the wavelet transform inherently performs a frequency analysis to the image. The perceptual analyzer may select the coefficients in which the watermark signal is embedded, or adjust the strength of the watermark signal for frequencies that are less visually sensitive.

Image activity over a predetermined area of an image may also be computed in the wavelet domain. For example, measurements of signal energy and image edges per a given area of the image can be measured in the wavelet domain. The perceptual analyzer transforms these measurements of signal activity to a corresponding control value that adjusts the strength of the watermark signal according to signal activity in that area.

The encoder may use a model of a human's sensitivity to contrast to map a measurement of local contrast in an area of an image to a control value that controls the strength of the watermark signal in that area. The strength of the watermark signal applied to the wavelet coefficients in that area is then adjusted based on the control value. The model of visual sensitivity to contrast may be derived experimentally by determining when changes to a signal at each of several different contrast levels become visible.

The encoder may also apply a model of sensitivity to colors. The watermark signal may be embedded by adjusting luminance values. These adjustments may be effected by making changes to color values that make the desired change to luminance. Changes of some colors may be more visible than others. As such, the perceptual analyzer may reduce or modify changes to certain wavelet coefficients based on sensitivity to color changes in an area of the image where those coefficients are located.

Encoding a Synchronization or Orientation Signal

As described above, the watermark may include a separate orientation or synchronization signal. One form of orientation signal is one that is defined as an array of impulse functions in the Fourier magnitude domain with pseudorandom phase. In a wavelet domain watermark encoding method, the orientation signal may be located in selected subbands that have a desired masking capability.

To avoid interference between the message signal and the orientation signal, the encoder may locate these signal components in distinct subbands or subband coefficients.

The watermark signal may perform functions of carying a message and facilitating computation of orientation.

Wavelet Based Watermark Decoding

Figure 24:
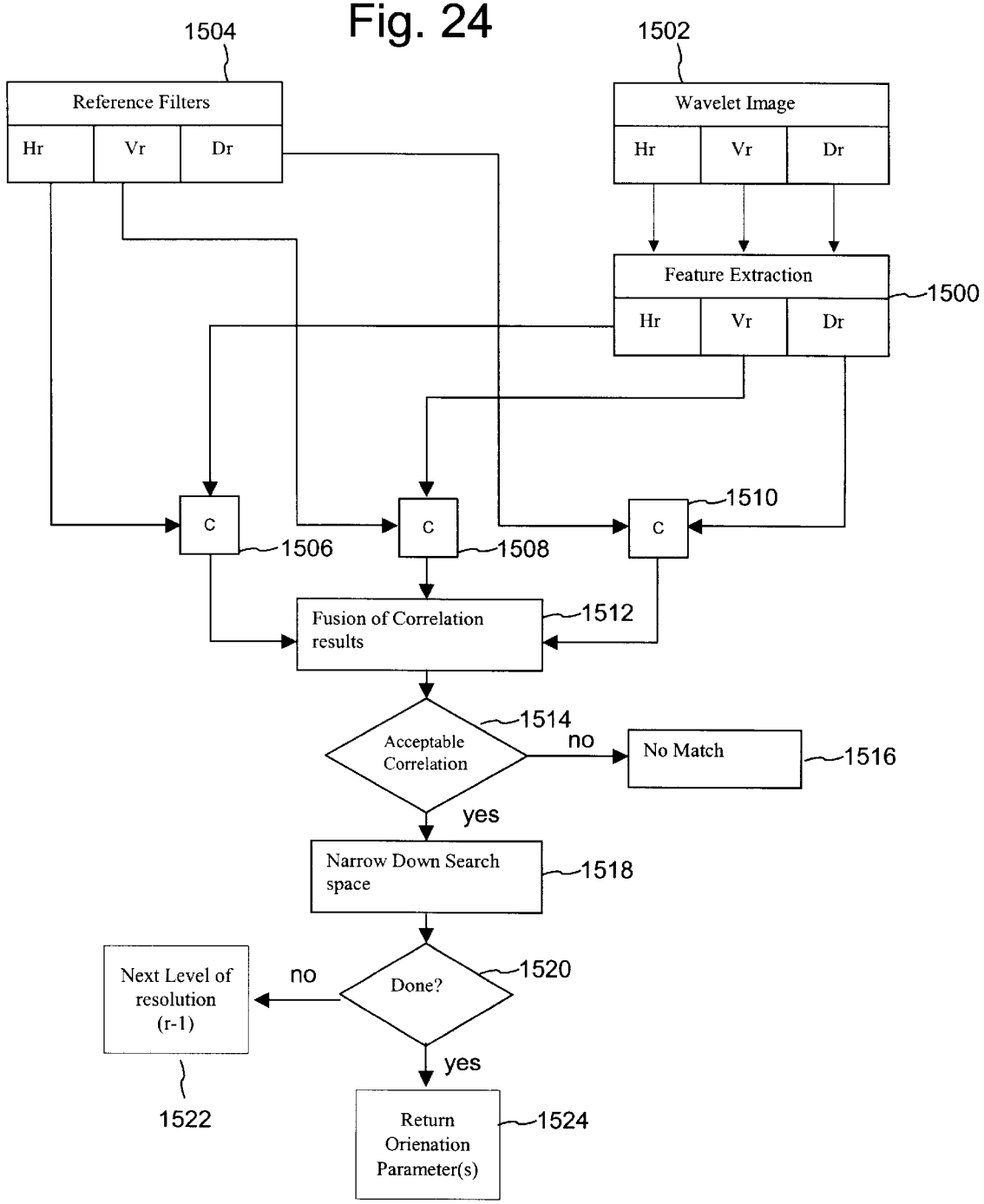
FIG. 24 is a diagram depicting a process for multi-level detection of a watermark.

FIG. 24 is a diagram depicting a process for multi-level detection of a watermark. There are two primary inputs: a reference signal and an image suspected of containing a watermark. A wavelet domain transform is applied to each of these signals to produce a wavelet decomposition. Since the reference signal is known, its wavelet decomposition can be pre-computed and stored in the decoder.

As shown in FIG. 24, a feature extractor 1500 operates on the wavelet decomposition of the suspect image 1502. The feature extractor performs a pre-filtering of the wavelet coefficients to extract a signal that is likely to contain the watermark signal (e.g., a signal representing the largest N wavelet coefficients in a band, where N is a predetermined number for that band). The feature extractor may be implemented as described above in connection with FIG. 22.

Next, the decoder performs a correlation between the reference signal 1504 and the pre-processed suspect image. In particular, the decoder performs a multi-level correlation of the reference signal and suspect signal at levels of the wavelet decomposition. At each level, the correlation (shown as symbols 1506–1510) may be performed simultaneously on corresponding subbands (H, V, D) of the reference and suspect signals.

There are a variety of forms of correlation that may be used. One example is to perform a log polar re-sampling of both signals and then perform a generalized matched filtering to measure the correlation in the log polar domain. The location of the highest correlation provides scale and rotation angle parameter candidates of the watermark's orientation.

Figure 25:
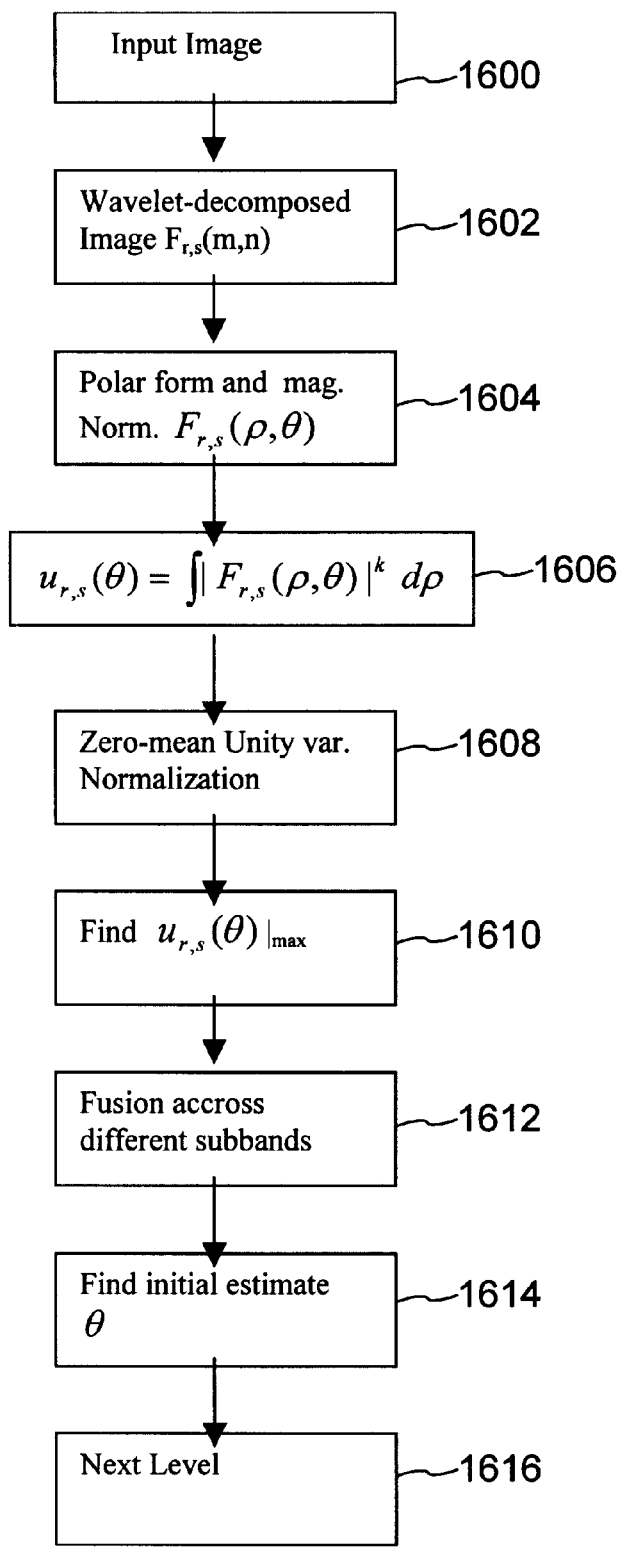
FIG. 25 is a flow diagram depicting a correlation process for detecting a watermark and determining its orienation.

Another example is to perform an orientation histogram form of correlation. This type of correlation is depicted in FIG. 25 and described below.

As depicted in FIG. 24, the correlation stage evaluates corresponding subbands from the reference and suspect signals at a level of decomposition. It then "fuses" the correlation results from these subbands, meaning that it combines the results (1512). The results may be combined in many different ways. Some examples are averaging the detection values for each band or computing a weighted average where detection values from bands that are more likely to have a reliable watermark signal are weighted more heavily than other values. The weighting may be based on the results of the band selection analysis of the detector. For example, bands with higher average energy may be given greater weight than other bands. Another example is applying majority rule criteria where orientation parameters from different bands within a given range of each other are retained. For example, if the orientation parameters from two bands are similar, and the results from a third band are dissimilar to the first two, then the first two are retained and the third is rejected. The retained orientation parameters may then be combined by averaging, weighted averaging, etc.

The multi-level correlation may be implemented so as to start with the lowest level of resolution and refine the results of the correlation with each higher level of resolution. In particular, the orientation parameters produced in each level are refined with increasing resolution of the wavelet decomposition. If the measurements of correlation at a given level do not exceed a threshold for that level, the suspect signal is rejected as being un-watermarked (as shown in blocks 1514 and 1516 in FIG. 24). Alternatively, if the detection values from the previous level were exceedingly strong (as measured against a threshold), then the correlation may continue by skipping the current level and proceeding to the next level using an appropriate search space.

Conversely, if the correlation measurement exceeds a threshold, the detection process narrows the search space for the orientation parameter or parameters (e.g., rotational angle, scale, translation) 1518 and continues to the next level unless it has already reached the highest level of resolution (see blocks 1520, 1522). When it has completed correlation at the highest level of resolution, the detection process returns the orientation parameter or parameters found to provide the highest correlation (1524).

Different forms of correlation may be used at different levels of the decomposition. In one implementation, for example, a relatively coarse yet efficient composite filter may be performed at a lower resolution decomposition to get an initial rough estimate of the orientation of the watermark signal in the suspect image. For example, a set of fixed composite filters, each tuned to measure correlation at a fixed range of distortion, may be used to get an initial range of the geometric distortion. Each filter, for example, may measure correlation in a range of rotational angles. The range with the best correlation is then used as a limiting range for the rotational angle candidates used in correlation at higher levels of the decomposition.

Wavelet domain detection operations may be used in combination with other detection operations in other domains to find orientation parameters. For example, the multilevel correlation operation in the wavelet domain may be used to find a rotation angle. The orientation can then be refined by adjusting the image data according to the rotation angle and then calculating other parameters like scale, translation, differential scale and shear in another domain, such as the Fourier magnitude domain or the spatial domain. For example, if the detection process employs a wavelet transform that is not translation invariant, then the rotation angle may be computed in the wavelet domain and the image data may be transformed into another domain for computing other parameters such as translation. Translation may be computed by performing correlation, such as matched filtering, between a reference orientation signal and the image data suspected of containing a watermark.

Also, the wavelet domain transform may be used to isolate bands where the watermark is expected to be located. After isolating these bands, the remainder of the image data can be ignored in further detection operations in the wavelet or other domains.

FIG. 25 is a flow diagram depicting a type of correlation process that may be used to refine the initial correlation results. This particular correlation method attempts to find a rotation angle at a given resolution level that provides the best correlation between the reference signal (e.g., the watermark orientation signal) and the suspect signal. The suspect image 1600 is wavelet decomposed into a low resolution level (the approximate level) and higher resolution levels ("r" refers to resolution), each having subbands, s (H, V, and D) (1602).

The samples in each subband are re-sampled into a polar and magnitude form (1604). Next, the correlation is measured by integrating over the magnitude dimension for each of several rotation angle candidates in a specified range, such as the range provided by the composite filter described above (1606). This process produces a set of correlation values with a measure of correlation for each rotation angle candidate. Next, a zero mean, unity variance normalization is performed on the results and the angle with the highest correlation is selected (1608, 1610).

This process is repeated for each subband in the decomposition level. An estimate of the rotation angle is then computed from the rotation angle candidates selected from each subband (1612). The estimate may be computed as the average or weighted average of the rotational angles computed for each band at the current resolution level.

Concluding Remarks

Having described and illustrated the principles of the technology with reference to specific implementations, it will be recognized that the technology can be implemented in many other, different, forms. For example, the wavelet domain based watermark encoding and decoding methods may be applied to still image, video and audio media signal types. The process of detecting a watermark and reading a message embedded in a watermark may be integrated to varying degrees. The detection process may isolate portions of the host signal to identify a watermark and determine its orientation, and the reading process may then operate on the same or different parts of the suspect signal, using the orientation parameters to align the data and decode the watermark message. This approach facilitates fast detection on a subset of the suspect signal, followed by message reading on larger portions of the suspect signal to extract the watermark message. The detection and message reading operations may operate concurrently on the same or different parts of the suspect signal. The watermark message and orientation signal may be integrated or separate.

To provide a comprehensive disclosure without unduly lengthening the specification, applicants incorporate by reference the patents and patent applications referenced above.

The particular combinations of elements and features in the above-detailed embodiments are exemplary only; the interchanging and substitution of these teachings with other teachings in this and the incorporated-by-reference patents/applications are also contemplated.

We claim:

1. A method of encoding an auxiliary signal in a media signal comprising:
    performing a wavelet decomposition of the media signal into two or more levels of resolution, including an approximate level and one or more higher resolution levels;
    modifying the approximate level to encode an auxiliary signal such that the modification is substantially imperceptible in an output form of the media signal;
    wherein the auxiliary signal comprises a watermark orientation signal.

2. The method of claim 1 wherein the watermark orientation signal forms a predetermined pattern in a frequency domain.

3. The method of claim 2 wherein the watermark orientation signal comprises a set of impulse functions in the frequency domain.

4. The method of claim 1 wherein the auxiliary signal carries a message including two or more symbols.

5. The method of claim 4 wherein the orientation signal has attributes for determining orientation of the watermark signal and attributes for carrying the message.

6. The method of claim 1 wherein the media signal is an image signal and the watermark orientation signal is used to determine at least one orientation parameter describing orientation of the auxiliary signal in the image.

7. The method of claim 6 wherein the orientation parameter is a rotation angle.

8. A computer readable medium having software for performing the method of claim 1.

9. A method of detecting an auxiliary signal embedded in a media signal, where the auxiliary information is substantially imperceptible in an output form of the media signal; the method comprising:
    performing a wavelet decomposition of the media signal into two or more levels of resolution, including an approximate level and one or more higher resolution levels; and
    detecting the auxiliary information from the approximate level;
    wherein the auxiliary signal comprises a watermark orientation signal; and further including:
    using the orientation signal to determine orientation of the auxiliary signal in the media signal.

10. The method of claim 9 wherein the orientation signal forms a predetermined pattern in a frequency domain.

11. The method of claim 10 wherein the predetermined pattern comprises a set of impulse functions in the frequency domain, the impulse functions having pseudorandom phase.

12. The method of claim 9 including:
    performing correlation between a reference orientation signal and the approximate level of the media signal to determine orientation of the auxiliary signal.

13. The method of claim 12 including:
    performing a log re-sampling of the approximate level; and
    performing the correlation on the re-sampled media signal and log sampled version of the reference orientation signal.

14. The method of claim 12 including:
    performing a polar re-sampling of the approximate level; and
    performing the correlation on the re-sampled media signal and polar sampled version of the reference orientation signal.

15. A computer readable medium having software for performing the method of claim 9.

16. A method of embedding an auxiliary signal into a media signal so that the auxiliary signal is substantially imperceptible to a human in the embedded media signal, the method comprising:
    performing a wavelet decomposition of the media signal; and
    embedding a watermark orientation signal into the wavelet decomposition, wherein the auxiliary signal includes the watermark orientation signal and the watermark orientation signal has attributes used to determine orientation of the auxiliary signal in a geometrically distorted version of the media signal.

17. The method of claim 16 wherein the auxiliary signal carries a message of one or more symbols.

18. The method of claim 17 wherein the watermark orientation signal carries the message.

19. The method of claim 16 wherein the watermark orientation signal forms a predetermined pattern in a frequency domain.

20. The method of claim 19 wherein the watermark orientation signal comprises a set of impulse functions with random phase in the frequency domain.

21. A computer readable medium having software for performing the method of claim 16.

22. A method of detecting an auxiliary signal embedded in a media signal, where the auxiliary signal is substantially imperceptible in an output form of the media signal; the method comprising:
    performing a wavelet decomposition of the media signal into two or more levels of resolution; and
    correlating a reference watermark orientation signal with the wavelet decomposition of the media signal to determine orientation of the auxiliary signal in the media signal.

23. The method of claim 22 including:
    performing multi-level correlation between the reference watermark orientation signal and the wavelet decomposition.

24. The method of claim 23 including:

performing correlation at an initial low level of resolution of the wavelet decomposition; and refining results of the correlation at least one higher level of resolution of the wavelet decomposition.

25. The method of claim 22 including:

performing correlation at subbands within a level of resolution of the wavelet decomposition;

and combining results of the correlations at the subbands.

26. The method of claim 22 including:

performing a polar resampling of at least one level of resolution; and performing correlation on the resampled level of correlation.

27. A computer readable medium including software for performing the method of claim 22.

* * * * *